United States Patent
Araki et al.

(10) Patent No.: US 6,301,064 B1
(45) Date of Patent: *Oct. 9, 2001

(54) OPTICAL APPARATUS

(75) Inventors: Keisuke Araki; Tsunefumi Tanaka; Makoto Sekita, all of Yokohama; Kenichi Kimura, Kawasaki; Norihiro Nanba, Kawasaki; Hiroshi Saruwatari, Kawasaki; Takeshi Akiyama, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/917,889

(22) Filed: Aug. 27, 1997

(30) Foreign Application Priority Data

Aug. 27, 1996 (KR) .................................................. 8-244139

(51) Int. Cl.[7] .............................. G02B 5/04; G02B 27/14
(52) U.S. Cl. .......................... 359/834; 359/431; 359/630; 359/633
(58) Field of Search .................................... 359/362–366, 359/385, 399, 402–403, 421–422, 432, 676, 618, 625–636, 850–860

(56) References Cited

U.S. PATENT DOCUMENTS

| 3,012,464 | * 12/1961 | Papke ................................ 359/385 |
| 3,674,334 | 7/1972 | Offner ................................ 359/364 |
| 4,265,510 | 5/1981 | Cook ................................... 359/857 |
| 4,737,021 | 4/1988 | Korsch ................................ 359/857 |
| 4,775,217 | 10/1988 | Ellis ................................... 359/857 |
| 4,812,030 | 3/1989 | Pinson ................................ 359/857 |
| 4,993,818 | 2/1991 | Cook ................................... 359/857 |
| 5,063,586 | 11/1991 | Jewell et al. .......................... 378/34 |
| 5,452,126 | * 9/1995 | Johnson .............................. 359/726 |
| 5,644,436 | * 7/1997 | Togino et al. ........................ 359/730 |
| 5,689,736 | * 11/1997 | Okuyama et al. .................... 359/630 |
| 5,701,202 | * 12/1997 | Takahashi ........................... 359/631 |
| 5,734,505 | * 3/1998 | Togino et al. ........................ 359/633 |

FOREIGN PATENT DOCUMENTS

| 2-297516 | 12/1990 | (JP) . |
| 5-12704 | 1/1993 | (JP) . |
| 6-139612 | 5/1994 | (JP) . |

* cited by examiner

Primary Examiner—Thong Nguyen
(74) Attorney, Agent, or Firm—Fitzpatrick, Cella, Harper & Scinto

(57) ABSTRACT

An optical apparatus includes an optical unit including a light entrance surface, light reflecting surfaces and a light exit surface all of which are integrally formed of transparent material, and the optical unit has in its interior an internal refracting surface for refracting light. Since a light beam passes through the optical unit from the light entrance surface to the light exit surface via the internal refracting surface and the light reflecting surfaces along a bent optical path, the optical apparatus is reduced in size and improved in optical performance, particularly, well corrected in chromatic aberration. Another disclosed optical apparatus is arranged to achieve zooming by using a plurality of optical units each of which is similar to the aforesaid optical unit.

13 Claims, 20 Drawing Sheets

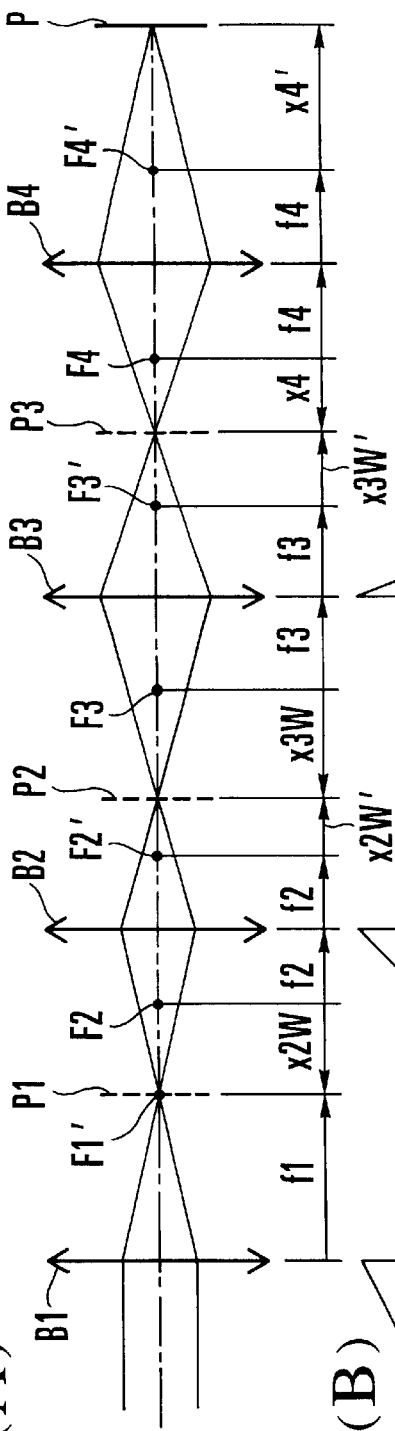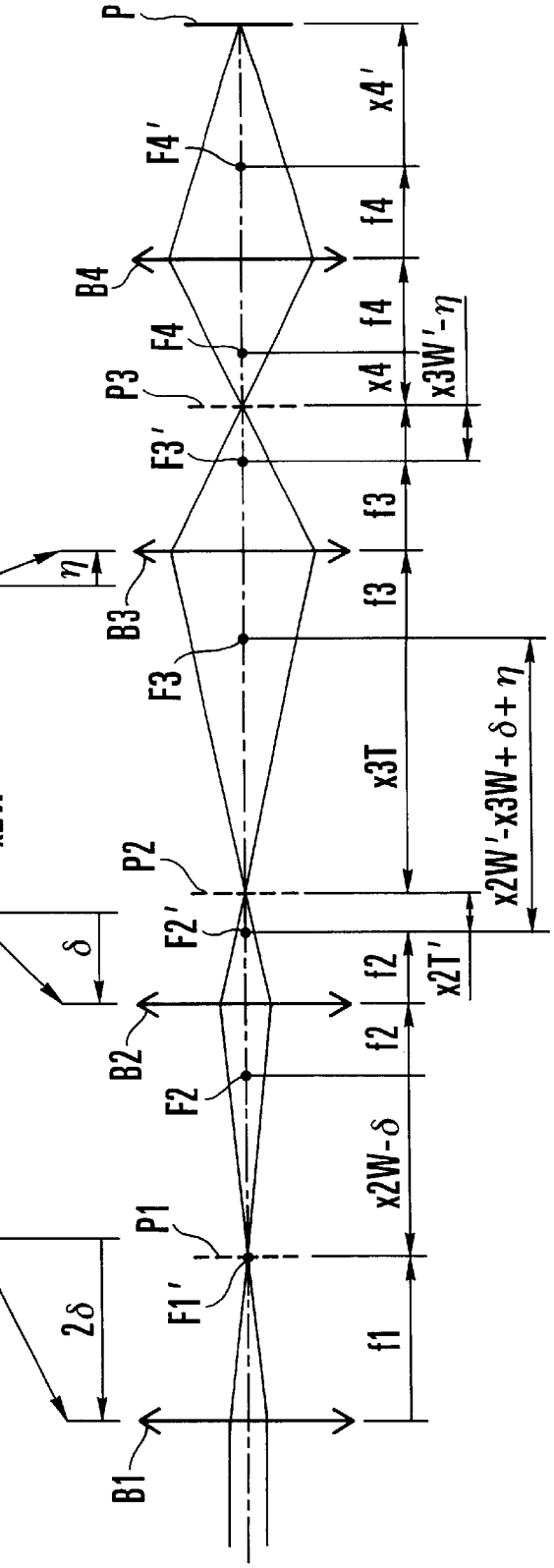
FIG. 11(A)
FIG. 11(B)

WIDE-ANGLE END

MIDDLE POSITION

TELEPHOTO END

OPTICAL APPARATUS

BACKGROUND OF THE INVENTION

1. Field of the Invention

The present invention relates to an optical unit and a zoom optical system employing the same, as well as an image pickup apparatus employing them and, more particularly, to an optical arrangement suitable for use in a video camera, a still video camera, a copying machine or the like and that employs a plurality of reflecting-type optical units each having a plurality of reflecting surfaces and performs zooming (variation of magnification) by varying the relative position between at least two optical units from among the plurality of optical units.

2. Description of Related Art

Various photographing optical systems that utilize reflecting surfaces, such as concave mirror surfaces and convex mirror surfaces, have heretofore been proposed. FIG. 17 is a schematic view of a so-called mirror optical system composed of one concave mirror and one convex mirror.

In the mirror optical system shown in FIG. 17, an object light beam 104 from an object is reflected by a concave mirror 101 and travels toward an object side while being converged, and after having been reflected by a convex mirror 102, the object light beam 104 forms an image of the object on an image plane 103.

This mirror optical system is based on the construction of a so-called Cassegrainian reflecting telescope, and is intended to reduce the entire length of the optical system by folding, by using two opposed reflecting mirrors, and the optical path of a telephoto lens system, which is composed of refracting lenses and has an entire large length.

For similar reasons, in the field of an objective lens system that constitutes part of a telescope lens system as well, a multiplicity of types, which are arranged to reduce the entire length of an optical system by using a plurality of reflecting mirrors, have been proposed.

As is apparent from the above description, it has heretofore been proposed to provide a compact mirror optical system by efficiently folding an optical path by using reflecting mirrors in place of lenses that are commonly used in a photographing lens whose entire length is large.

However, in general, the mirror optical system, such as the Cassegrainian reflecting telescope, has the problem that part of an object ray is blocked by the convex mirror 102. This problem is due to the fact that the convex mirror 102 is placed in the area through which the object light beam 104 passes.

To solve the problem, it has been proposed to provide a mirror optical system that employs decentered reflecting mirrors to prevent a portion of the optical system from blocking the area through which the object light beam 104 passes, i.e., to separate a principal ray 106 of the object light beam 104 from an optical axis 105.

FIG. 18 is a schematic view of the mirror optical system disclosed in U.S. Pat. No. 3,674,334. This mirror optical system solves the above-described blocking problem by separating a principal ray 116 of an object light beam 115 from an optical axis 114 by decentering the central axis of reflecting mirrors from the optical axis 114.

In the mirror optical system shown in FIG. 18, a concave mirror 111, a convex mirror 113 and a concave mirror 112 are arranged in the order of passage of the light beam, and these mirrors 111, 113 and 112 are reflecting mirrors that are rotationally symmetrical about the optical axis 114, as shown by two-dot chain lines in FIG. 18. In the shown mirror optical system, a principal ray 116 of an object light beam 115 is separated from the optical axis 114 to prevent blockage of the object light beam 115, by using only the upper portion of the concave mirror 111, which is above the optical axis 114 as viewed in FIG. 18, only the lower portion of the convex mirror 113, which is below the optical axis 114 as viewed in FIG. 18, and only the lower portion of the concave mirror 112 which is below the optical axis 114 as viewed in FIG. 18.

FIG. 19 is a schematic view of the mirror optical system disclosed in U.S. Pat. No. 5,063,586. The mirror optical system shown in FIG. 19 solves the above-described problem by decentering the central axis of each reflecting mirror from an optical axis and separating the principal ray of an object light beam from the optical axis.

As shown in FIG. 19 in which an axis perpendicular to an object plane 121 is defined as an optical axis 127, a convex mirror 122, a concave mirror 123, a convex mirror 124 and a concave mirror 125 are arranged in the order of passage of the light beam, and the central coordinates and central axes 122a, 123a, 124a and 125a (axes which respectively connect the centers of reflecting surfaces and the centers of curvature thereof) of the reflecting surfaces of the respective mirrors 122 to 125 are decentered from the optical axis 127. In the mirror optical system shown in FIG. 19, by appropriately setting the amount of decentering and the radius of curvature of each of the surfaces, each of the reflecting mirrors is prevented from blocking an object light beam 128, so that an object image is efficiently formed on an image forming plane 126.

In addition, U.S. Pat. Nos. 4,737,021 and 4,265,510 also disclose an arrangement for preventing the blocking problem by using part of a reflecting mirror that is rotationally symmetrical about an optical axis, or an arrangement for preventing the blocking problem by decentering the central axis of the reflecting mirror from the optical axis.

In addition, a zooming art is known that varies the image forming magnification (focal length) of a photographing optical system by relatively moving a plurality of reflecting mirrors that constitute part of the aforesaid type of mirror optical system.

For example, U.S. Pat. No. 4,812,030 discloses art for varying the magnification of the photographing optical system by relatively varying the distance between the concave mirror 101 and the convex mirror 102 and the distance between the convex mirror 102 and the image plane 103 in the construction of the Cassegrainian reflecting telescope shown in FIG. 17.

FIG. 20 is a schematic view of another embodiment disclosed in U.S. Pat. No. 4,812,030. In the embodiment shown in FIG. 20, an object light beam 138 from an object is made incident on and reflected by a first concave mirror 131, and travels toward an object side as a converging light beam and is made incident on a first convex mirror 132. The light beam is reflected toward an image forming plane by the first convex mirror 132 and is made incident on a second convex mirror 134 as an approximately parallel light beam. The light beam is reflected by the second convex mirror 134 and is made incident on a second concave mirror 135 as a diverging light beam. The light beam is reflected by the second concave mirror 135 as a converging light beam and forms an image of the object on an image plane 137.

In this arrangement, the distance 133 between the first concave mirror 131 and the first convex mirror 132 and the distance 136 between the second convex mirror 134 and the second concave mirror 135 are varied to perform zooming, thereby varying the focal length of the entire mirror optical system.

In the arrangement disclosed in U.S. Pat. No. 4,993,818, an image formed by the Cassegrainian reflecting telescope shown in FIG. 17 is secondarily formed by another mirror optical system provided in a rear stage, and the magnification of the entire photographing optical system is varied by varying the image forming magnification of that secondary image forming mirror optical system.

In any of the above-described reflecting types of photographing optical systems, a large number of constituent components are needed and individual optical components need to be assembled with high accuracy to obtain the required optical performance. Particularly since the relative position accuracy of each of the reflecting mirrors is strict, it is indispensable to adjust the position and the angle of each of the reflecting mirrors.

One proposed approach to solving this problem is to eliminate the incorporation error of optical components that occurs during assembly, as by forming a mirror system as one block.

A conventional example in which a multiplicity of reflecting surfaces are formed as one block is an optical prism, such as a pentagonal roof prism and a Porro prism, which is used in, for example, a viewfinder optical system.

In the case of such a prism, since a plurality of reflecting surfaces are integrally formed, the relative positional relationships between the respective reflecting surfaces are set with high accuracy, so that adjustment of the relative positions between the respective reflecting surfaces is not needed. Incidentally, the primary function of the prism is to reverse an image by varying the direction in which a ray travels, and each of the reflecting surfaces consists of a plane surface.

Another type of optical system, such as a prism having reflecting surfaces with curvatures, is also known.

FIG. 21 is a schematic view of the essential portion of the observing optical system, which is disclosed in U.S. Pat. No. 4,775,217. This observing optical system is an optical system that not only allows an observer to observe a scene of the outside but also allows the observer to observe a display image displayed on an information display part, in the form of an image that overlaps the scene.

In this observing optical system, a display light beam 145 that exits from the display image displayed on an information display part 141 enters from an entrance surface 148, and is reflected by a surface 142 and travels toward an object side and is made incident on a half-mirror surface 143 consisting of a concave surface. After having been reflected by the half-mirror surface 143, the display light beam 145 is formed into an approximately parallel light beam by the refractive power of the half-mirror surface 143. This approximately parallel light beam is refracted by and passes through a surface 142, and forms a magnified virtual image of the display image and enters a pupil 144 of an observer so that the observer recognizes the display image.

In the meantime, an object light beam 146 from an object is made incident on a surface 147, which is approximately parallel to the reflecting surface 142, and is then refracted by the surface 147 and reaches the half-mirror surface 143, which is a concave surface. Since the concave surface 143 is coated with an evaporated semi-transparent film, part of the object light beam 146 passes through the concave surface 143, is refracted by and passes through the surface 142, and enters the pupil 144 of the observer. Thus, the observer can visually recognize the display image as an image that overlaps the scene of the outside.

FIG. 22 is a schematic view of the essential portion of the observing optical system disclosed in Japanese Laid-Open Patent Application No. Hei 2-297516. This observing optical system is also an optical system that not only allows an observer to observe a scene of the outside but also allows the observer to observe a display image displayed on an information display part, as an image that overlaps the scene.

In this observing optical system, a display light beam 154 that exits from an information display part 150 enters a prism Pa through a plane surface 157, which constitutes part of the prism Pa, and is made incident on a parabolic reflecting surface 151.

The display light beam 154 is reflected by the reflecting surface 151 as a converging light beam, and forms an image on a focal plane 156. At this time, the display light beam 154 reflected by the reflecting surface 151 reaches the focal plane 156 while being totally reflected between two parallel plane surfaces 157 and 158, which constitute part of the prism Pa. Thus, the thinning of the entire optical system is achieved.

Then, the display light beam 154 that exits from the focal plane 156 as a diverging light beam is totally reflected between the plane surface 157 and the plane surface 158, and is made incident on a half-mirror surface 152, which consists of a parabolic surface. The display light beam 154 is reflected by the half-mirror surface 152 and, at the same time, not only is a magnified virtual image of a display image formed but also the display light beam 154 is formed into an approximately parallel light beam by the refractive power of the half-mirror surface 152. The obtained light beam passes through the surface 157 and enters a pupil 153 of the observer, so that the observer can recognize the display image.

In the meantime, an object light beam 155 from the outside passes through a surface 158b that constitutes part of a prism Pb, then through the half-mirror surface 152 that consists of a parabolic surface, then through the surface 157, and is then made incident on the pupil 153 of the observer. Thus, the observer visually recognizes the display image as an image that overlaps the scene of the outside.

As another example that uses an optical unit on a reflecting surface of a prism, optical heads for optical pickups are disclosed in, for example, Japanese Laid-Open Patent Application Nos. Hei 5-12704 and Hei 6-139612. In these optical heads, after the light outputted from a semiconductor laser has been reflected by a Fresnel surface or a hologram surface, the reflected light is focused on a surface of a disk and the light reflected from the disk is conducted to a detector.

In any of the above-described mirror optical systems having the decentered mirrors, which are disclosed in U.S. Pat. Nos. 3,674,334, 5,063,586 and 4,265,510, since the individual reflecting mirrors are disposed with different amounts of decentering, the mounting structure of each of the reflecting mirrors is very complicated and the mounting accuracy of the reflecting mirrors is very difficult to ensure.

In either of the above-described photographing optical systems having magnification varying functions, which are disclosed in U.S. Pat. Nos. 4,812,030 and 4,993,818, since a large number of constituent components, such as a reflecting mirror or an image forming lens, are needed, it is necessary to assemble each optical part with high accuracy to realize the required optical performance.

In particular, since the relative position accuracy of the reflecting mirrors is strict, it is necessary to adjust the position and the angle of each of the reflecting mirrors.

As is known, conventional reflecting types of photographing optical systems have constructions which are suited to a so-called telephoto lens using an optical system having an entire large length and a small angle of view. However, if a photographing optical system which needs angles of view from an angle of view of a standard lens to an angle of view of a wide-angle lens is to be obtained, the number of reflecting surfaces which are required for aberration correction must be increased, so that a far higher component accuracy and assembly accuracy are needed and the cost and the entire size of the optical system tend to increase.

Either of the observing optical systems disclosed in U.S. Pat. No. 4,775,217 and Japanese Laid-Open Patent Application No. Hei 2-297516 is primarily intended to vary the direction of travel of a ray and a pupil's image forming action for efficiently transmitting to the pupil of an observer a display image displayed on the information display part which is disposed away from the pupil of the observer. However, neither of them directly discloses an art for performing positive aberration correction by using a reflecting surface having a curvature.

The range of applications of either of the optical systems for optical pickups which are disclosed in, for example, Japanese Laid-Open Patent Application Nos. Hei 5-12704 and Hei 6-139612 is limited to the field of a detecting optical system, and neither of them satisfies the image-forming performance required for, particularly, an image pickup apparatus that uses an area type of image pickup element, such as a CCD.

Incidentally, U.S. patent applications Ser. No. 08/606,825 filed on Feb. 26, 1996, Ser. No. 08/607,175 filed on Feb. 26, 1996, now U.S. Pat. No. 6,021,004; Ser. No. 08/606,824 filed on Feb. 26, 1996, now U.S. Pat. No. 6,166,866 and Ser. No. 08/828,835 filed on Mar. 24, 1997, now U.S. Pat. No. 5,999,311, which were commonly assigned to the assignee of the present invention, have been proposed as other related arts.

BRIEF SUMMARY OF THE INVENTION

An object of the present invention is to provide an optical apparatus that has improved optical performance, particularly, less chromatic aberration, in spite of its small size.

Another object of the present invention is to provide an optical unit having a plurality of curved and plane reflecting surfaces and the like, which are integrally formed, and a reflecting type of zoom optical system that includes a plurality of optical units, each similar to such an optical unit, and is arranged to perform zooming by appropriately varying the relative position between at least two of the plurality of optical units, so that the entire mirror optical system is reduced in size and the layout accuracy (assembly accuracy) of reflecting mirrors in the mirror optical system is reduced, as well as to provide an image pickup apparatus employing such optical unit or such zoom optical system.

Another object of the present invention is to provide a reflecting type of zoom optical system that has a wide angle of view in spite of its reduced effective diameter, owing to its arrangement in which a stop is disposed at a location closest to the object side of the optical system and an object image is formed in the optical system at least once, and also that has an entire length that is reduced in a predetermined direction by bending an optical path in the optical system into a desired shape by using optical units each having a plurality of reflecting surfaces and appropriate refractive power with the reflecting surfaces being decentered, as well as to provide an image pickup apparatus using such reflecting type of zoom optical system.

Another object of the present invention is to provide an optical system that is well corrected for chromatic aberration, although the number of integrally formed optical units is small, as well as to provide an image pickup apparatus using such optical system.

Another object of the present invention is to provide an optical system having an arrangement that makes it easy to obtain the required accuracy of production of constituent aspheric surfaces of an optical unit to be integrally formed, as well as to provide an image pickup apparatus using such optical system.

To achieve the above objects, the present invention provides an image forming optical apparatus that comprises an optical unit including a light entrance surface, light reflecting surfaces, and a light exit surface, all of which are integrally formed of transparent material, the optical unit having in its interior an internal refracting surface for refracting light. In particular, a refractive index of a medium before the internal refracting surface differs from that of a medium behind the internal refracting surface. Furthermore, each of the light reflecting surfaces has curvature varying according to azimuth angles. Furthermore, the light entrance surface is a curved surface having a shape of rotational symmetry. Furthermore, the light exit surface is a curved surface having a shape of rotational symmetry. Furthermore, the internal refracting surface is positioned immediately behind the light entrance surface. Furthermore, the internal refracting surface is positioned immediately before the light exit surface. Furthermore, the internal refracting surface has a spherical shape of rotational symmetry. The optical apparatus further comprises a second optical unit that shares an optical path with the optical unit and includes a light entrance surface, light reflecting surfaces and a light exit surface, all of which are integrally formed of transparent material. Furthermore, a variation of magnification is performed by varying a relative distance between the optical unit and the second optical unit. Furthermore, focusing is performed by varying the relative distance between the optical unit and the second optical unit. Furthermore, a stop member is provided in front of the light entrance surface. Furthermore, light that exits from the light exit surface forms an image at a position where an image pickup member is disposed. Furthermore, light that exits from the light exit surface of the second optical unit forms an image at a position where an image pickup member is disposed.

The above and other objects, features and advantages of the present invention will become apparent from the following detailed description of preferred embodiments of the present invention, taken in conjunction with the accompanying drawings.

BRIEF DESCRIPTION OF THE SEVERAL VIEWS OF THE DRAWING

FIGS. 11(A) and 11(B) are explanatory views aiding in explaining the magnification-varying operation of the sixth embodiment;

DETAILED DESCRIPTION OF THE INVENTION

Preferred embodiments of the present invention will be described below in detail with reference to the accompanying drawings.

Prior to the detailed description of individual embodiments, reference will be made to terms which are herein used to express various constituent elements of the embodiments, and matters common to all the embodiments.

Figure 16:
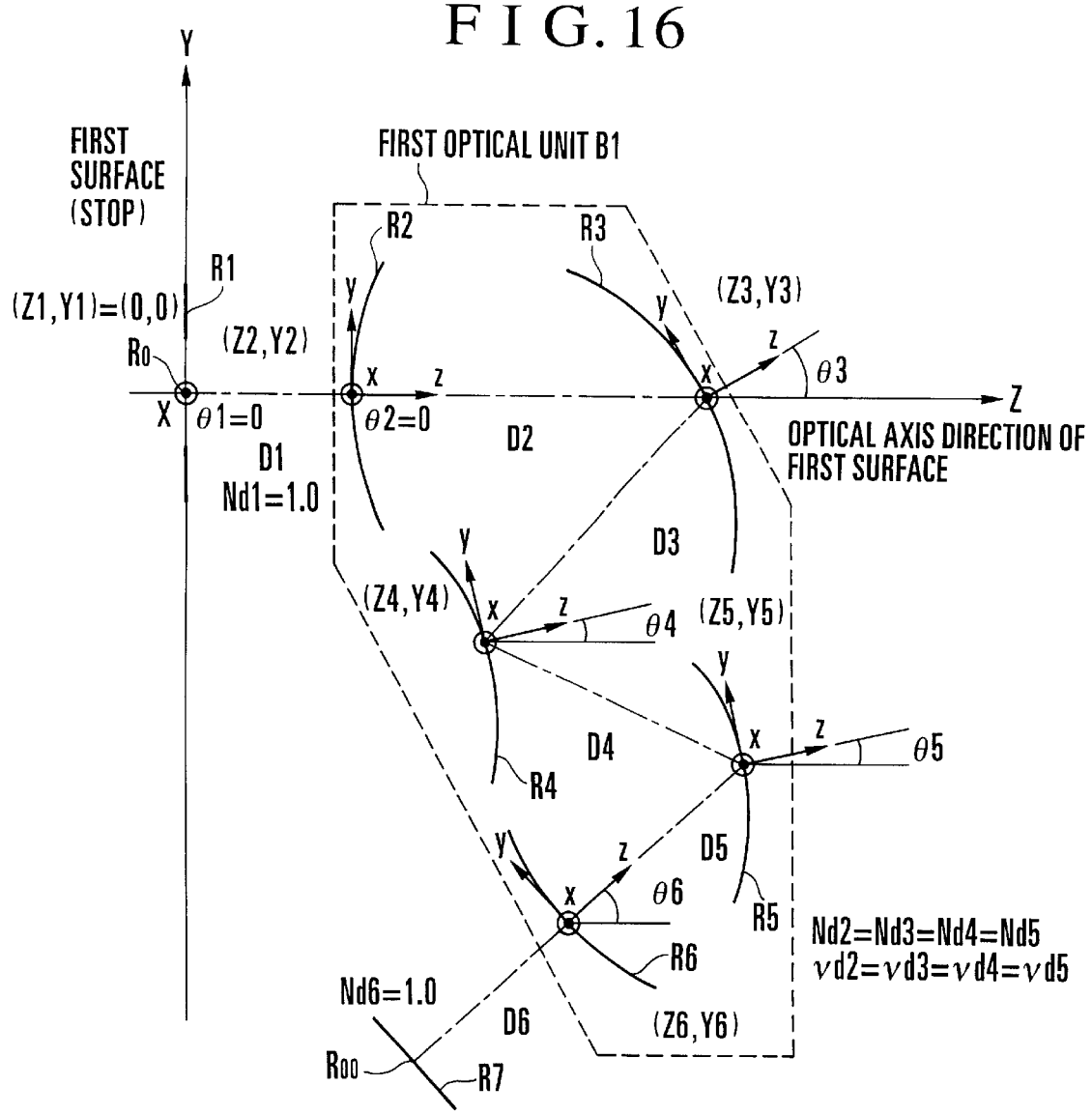
FIG. 16 is an explanatory view aiding in explaining a coordinate system that defines constituent data for an optical system according to the present invention.
Figure 17:
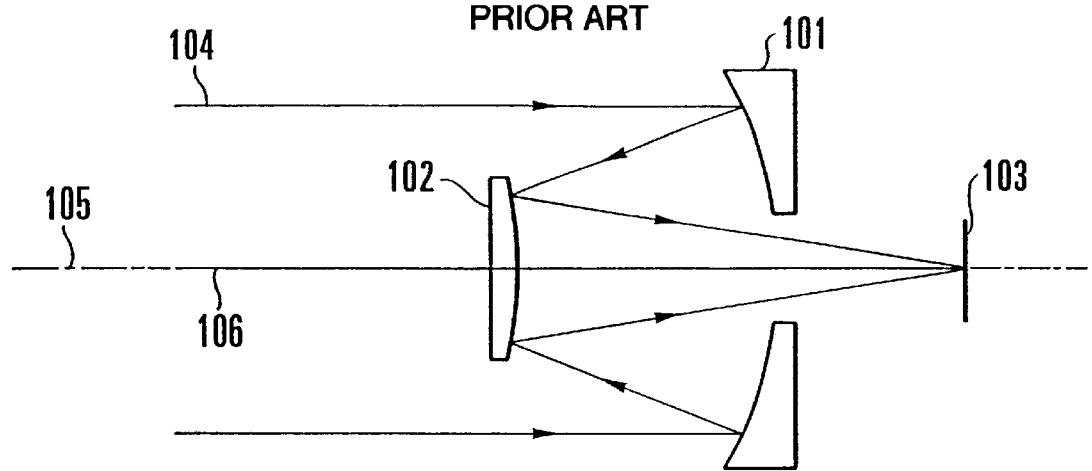
FIG. 17 is a view of the basic constriction of a Cassegrainian reflecting telescope.
Figure 18:
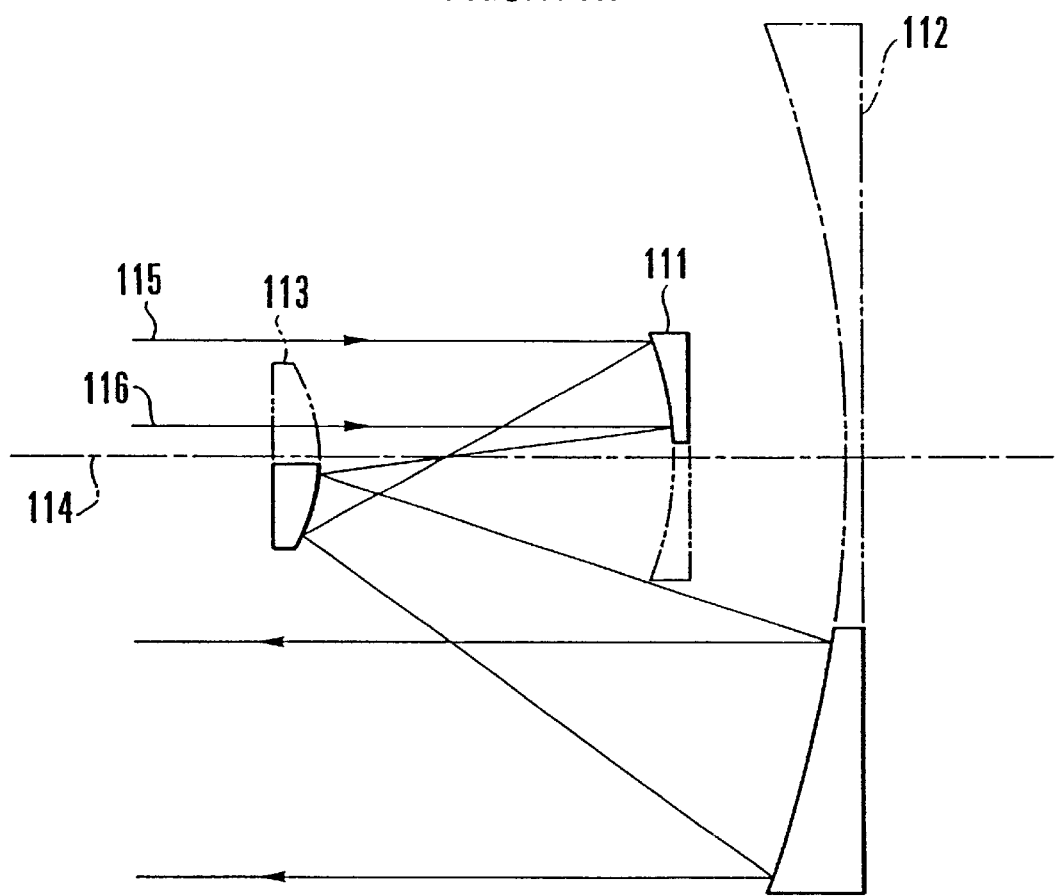
FIG. 18 is an explanatory view aiding in explaining a first method of preventing a blocking problem by separating a principal ray from an optical axis in a mirror optical system.
Figure 19:
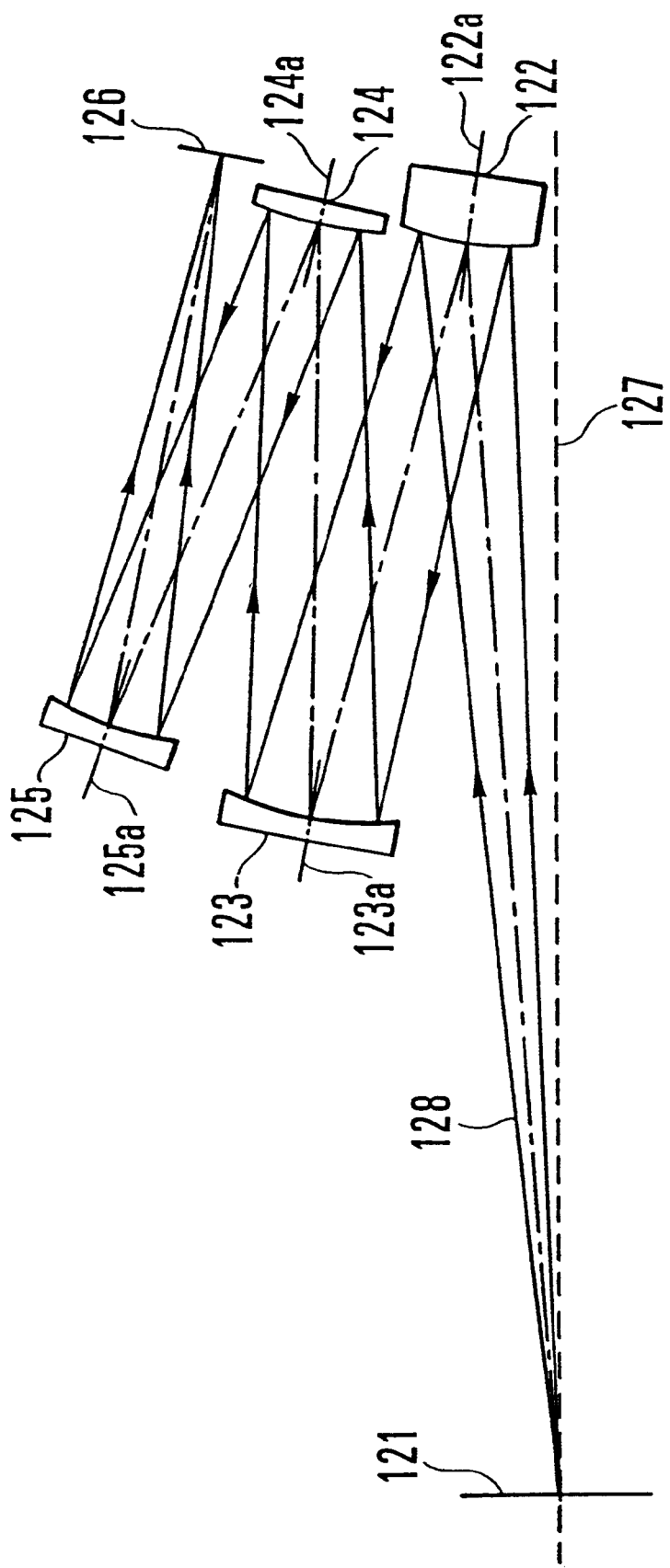
FIG. 19 is an explanatory view aiding in explaining a second method of preventing a blocking problem by separating a principal ray from an optical axis in a mirror optical system.
Figure 20:
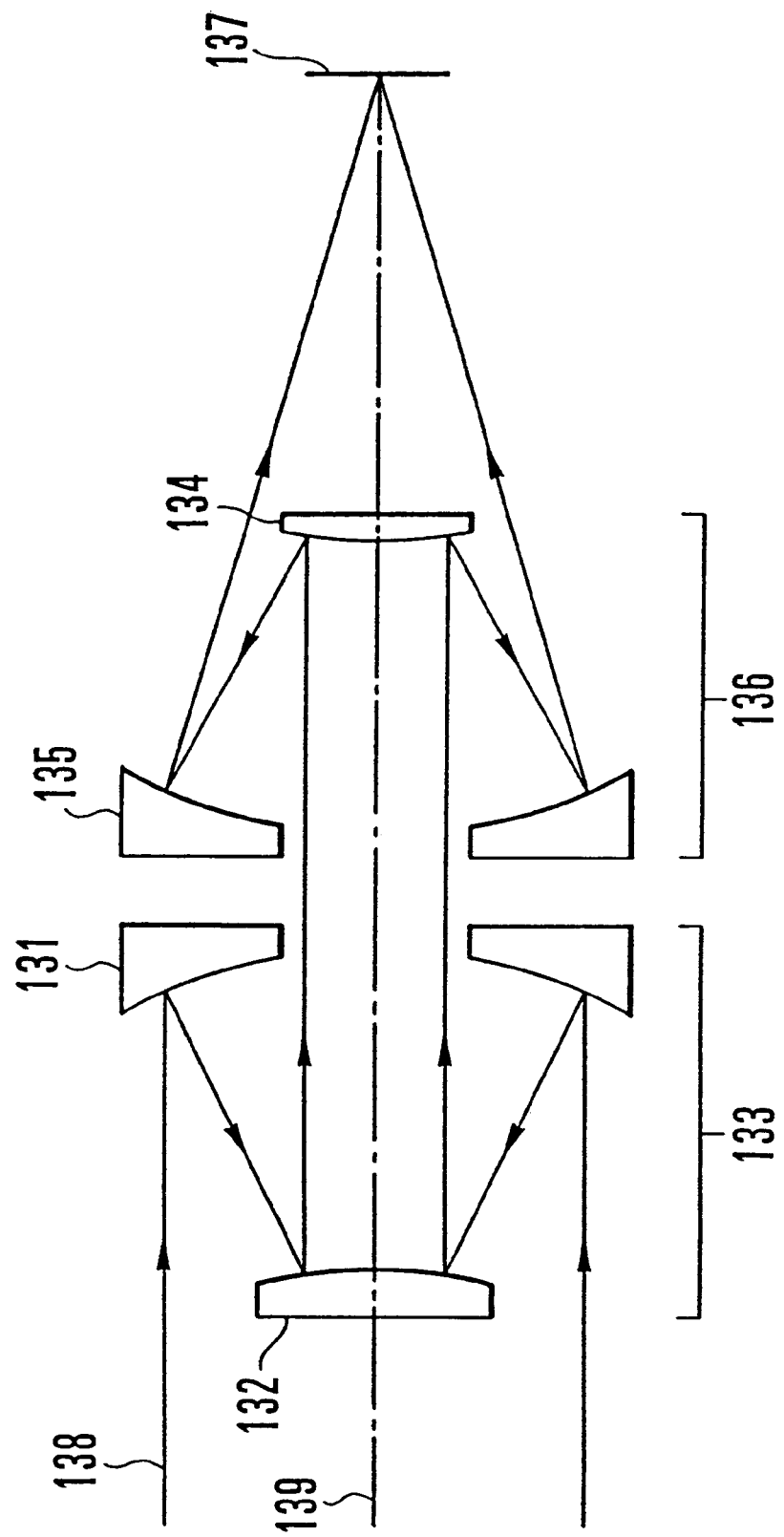
FIG. 20 is a schematic view of a zoom optical system that employs a conventional reflecting mirror arrangement.
Figure 21:
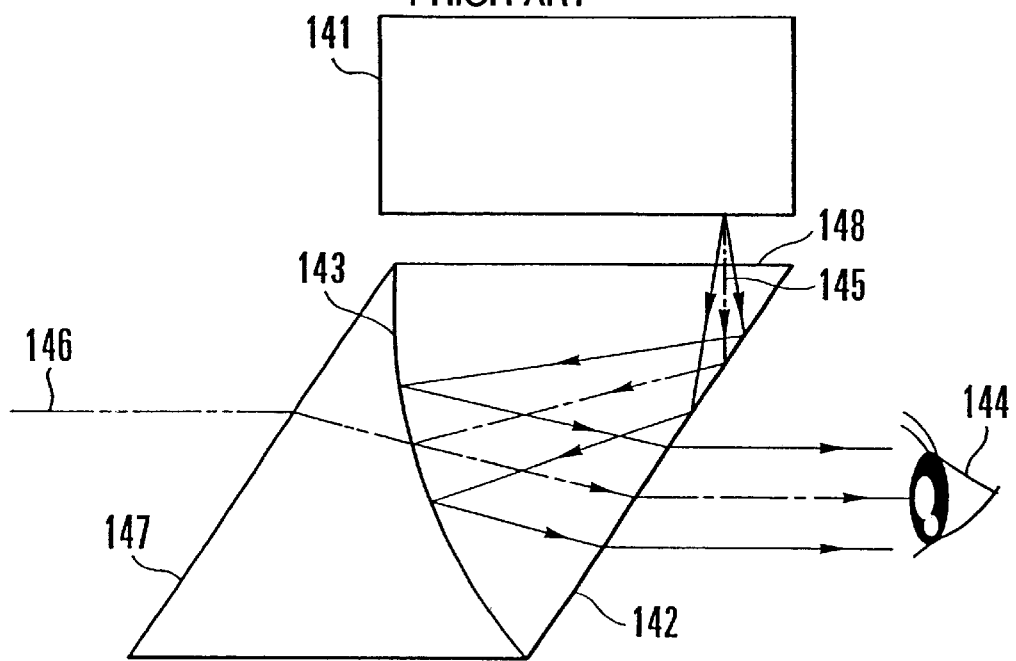
FIG. 21 is a schematic view of an observing optical system in which a prism reflecting surface has a curvature.
Figure 22:
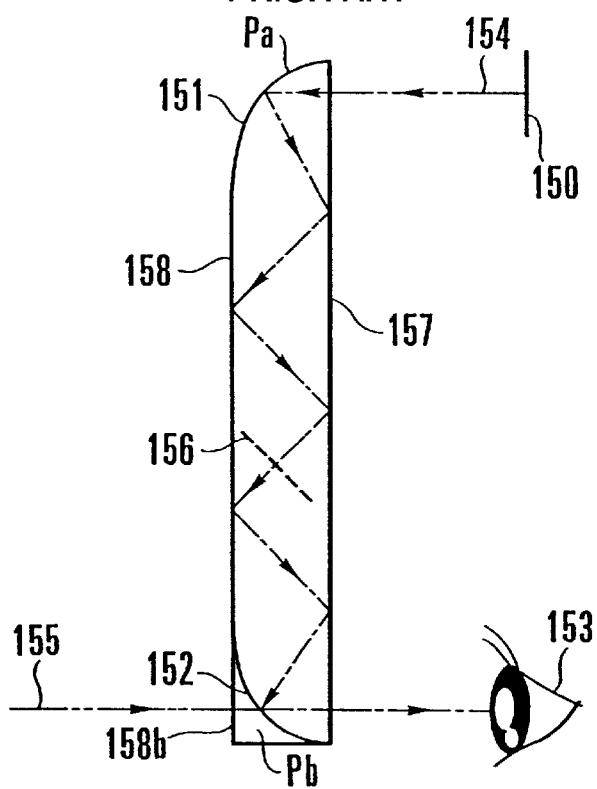
FIG. 22 is a schematic view of another observing optical system in which a prism reflecting surface has a curvature.

FIG. 16 is an explanatory view of a coordinate system that defines the constituent data of an optical system according to the present invention. In each of the embodiments of the present invention, the i-th surface is a surface that lies at the i-th position numbered from an object side from which a ray travels toward an image plane (the ray is shown by alternate long and short dash lines in FIG. 16 and is hereinafter referred to as the reference axis ray).

In FIG. 16, a first surface R1 is a stop, a second surface R2 is a refracting surface coaxial with the first surface R1, a third surface R3 is a reflecting surface that is tilted with respect to the second surface R2, a fourth surface R4 is a reflecting surface that is shifted and tilted with respect to the third surface R3, a fifth surface R5 is a reflecting surface that is shifted and tilted with respect to the fourth surface R4, and a sixth surface R6 is a refracting surface that is shifted and tilted with respect to the fifth surface R5. All of the second surface R2 to the sixth surface R6 are arranged on one optical unit composed of a medium (transparent body) such as glass or plastics. In FIG. 16, such optical unit is shown as a first optical unit B1.

Accordingly, in the arrangement shown in FIG. 16, the medium between an object plane (not shown) and the second surface R2 is air, the second surface R2 to the sixth surface R6 are arranged on a certain common medium, and the medium between the sixth surface R6 and a seventh surface R7 is air.

Since the optical system according to the present invention is a decentered optical system, the surfaces that constitute part of the optical system do not have a common optical axis. For this reason, in each of the embodiments of the present invention, an absolute coordinate system is set, the origin of which is the central point of an effective ray diameter at the first surface R1.

In each of the embodiments of the present invention, a central point Ro of the effective ray diameter at the first surface R1 is set as the origin, and the path of the ray (reference axis ray) that passes through this origin and a center Roo of a final image forming plane is defined as a reference axis (or axes) of the optical axis. In each of the present embodiments, the reference axes have directions, respectively. The directions correspond to the directions in which the reference axis ray travels to form an image.

In the embodiments of the present invention, although the reference axes that provide a reference for the optical system are set in the above-described manner, axes that are convenient for optical design, aberration correction or representation of the shape of each surface that constitutes part of the optical system may be adopted as the reference axes that provide a reference for the optical system. However, in general, the path of a ray that passes through the center of an image plane and through any one selected from among the center of the stop, the center of an entrance pupil, the center of an exit pupil, the center of the first surface of the optical system and the center of the final surface of the optical system is set as the reference axes that provide a reference for the optical system.

Specifically, in the embodiments of the present invention, although the ray (reference axis ray) that passes through the first surface, i.e., the central point of the effective ray diameter at the surface of the stop, and leads to the center of the final image forming plane is refracted and reflected along a path by individual refracting or reflecting surfaces, this path is set as the reference axis (axes). The order of the surfaces is set to the order in which the reference axis ray is subjected to refraction and reflection.

Accordingly, the reference axis finally reaches the center of the image plane while changing its direction in the order of the surfaces in accordance with the law of refraction or reflection.

Tilting planes that constitute part of the optical system of each of the embodiments of the present invention are basically tilted in the same plane. For this reason, each axis of the absolute coordinate system is defined as follows:

Z axis: reference axis that passes through the origin and extends to the second surface R2;

Y axis: straight line that passes through the origin and makes an angle of 90° with the Z axis in the counterclockwise direction in a tilting plane (on the surface of the sheet of FIG. 16); and X axis: straight line that passes through the origin and is perpendicular to each of the Z and Y axes (perpendicular to the surface of the sheet of FIG. 16).

If the surface shape of the i-th surface that constitutes part of the optical system is to be expressed, it is possible to more readily understand and recognize such surface shape by setting a local coordinate system, the origin of which is a point at which the reference axis intersects the i-th surface, and expressing the surface shape of the i-th surface by using the local coordinate system than by expressing the surface shape of the i-th surface by using the absolute coordinate system. Accordingly, in some embodiments of the present invention, the constituent data of which are shown herein, the surface shape of the i-th surface is expressed by its local coordinate system.

The tilting angle of the i-th surface in the Y, Z plane is expressed by an angle $\theta i$ (unit: degree), which shows a positive value in the counterclockwise direction with respect to the Z axis of the absolute coordinate system. Accordingly, in each of the embodiments of the present invention, the origins of the local coordinate systems of the respective surfaces are located on the Y, Z plane, as shown in FIG. 16. The decentering of the surfaces is absent in the X, Z plane or the X, Y plane. In addition, the y and z axes of the local coordinates (x, y, z) of the i-th surface are inclined by the angle $\theta i$ in the Y, Z plane with respect to the absolute coordinate system (X, Y, Z). Specifically, the x, y and z axes of the local coordinates (x, y, z) are set in the following manner:

z axis: straight line that passes through the origin of the local coordinates and makes the angle $\theta i$ with the Z direction of the absolute coordinate system in the counterclockwise direction in the Y, Z plane;

y axis: straight line that passes through the origin of the local coordinates and makes an angle of 90° with the z direction of the local coordinates in the counterclockwise direction in the Y, Z plane; and x axis: straight line that passes through the origin of the local coordinates and is perpendicular to the Y, Z plane.

Symbol Di indicates a scalar that represents the distance between the origin of the local coordinates of the i-th surface and that of the (i+1)-st surface. Symbols Ndi and vdi respectively indicate the refractive index and the Abbe number of the medium between the i-th surface and the (i+1)-st surface.

The optical system of each of the embodiments of the present invention has a plurality of optical units, and varies its entire focal length (magnification) by the movement of the plurality of optical units. Regarding each of the embodiments that have numerical data shown herein, the cross section of its optical system and the numerical data are shown with respect to three positions, i.e., a wide-angle end (W), a telephoto end (T) and a middle position (M).

If the optical unit shown in FIG. 16 moves in the Y, Z plane, the origin (Yi, Zi) of each of the local coordinate systems that represent the positions of the respective surfaces takes on a different value for each varied magnification position. However, in the case of the embodiments having the numerical data shown herein, since the optical unit is assumed to move in only the Z direction for the purpose of varying the magnification, the coordinate value Zi is expressed by Zi(W), Zi(M) and Zi(T) in the order of the wide-angle end, the middle position, and the telephoto end.

Incidentally, the coordinate values of each of the surfaces represent those obtained at the wide-angle end, and each of the middle position and the telephoto end is expressed as a difference between the coordinate values obtained at the wide-angle end and the coordinate values obtained, at the respective one of the middle position and the telephoto end. Specifically, letting "a" and "b" be the respective amounts of movements of the optical unit at the middle position (M) and the telephoto end (T) with respect to the wide-angle end (W), these amounts of movements are expressed by the following expressions:

$$Zi(M)=Zi(W)+a,$$

$$Zi(T)=Zi(W)+b.$$

If all the surfaces move in their Z plus directions, the signs of "a" and "b" are positive, whereas if they move in their Z minus directions, the signs of "a" and "b" are negative. The surface-to-surface distance Di which varies with these movements is a variable, and the values of the variable at the respective varied magnification positions are collectively shown on tables, which will be referred to later.

Each of the embodiments of the present invention has spherical surfaces and aspheric surfaces of rotational asymmetry. Each of the spherical surfaces has a spherical shape expressed by a radius of curvature "ri". The sign of the radius of curvature "ri" is minus if the center of curvature is located on the side of the first surface along the reference axis (shown by the alternate long and short dash lines in FIG. 16) that travels from the first surface to the image plane, whereas if the center of curvature is located on the side of the image forming plane along the reference axis, the sign of the radius of curvature "ri" is plus.

Each of the spherical surfaces is a shape expressed by the following expression:

$$z = \frac{(x^2 + y^2)/ri}{1 + \{1 - (x^2 + y^2)/ri^2\}^{1/2}}.$$

In addition, the optical system according to the present invention has at least one aspherical surface of rotational asymmetry, and its shape is expressed by the following expressions:

$$A=(a+b) \cdot (y^2 \cdot \cos^2 t + X^2)$$

$$B=2a \cdot b \cos t [1+\{(b-a) \cdot y \sin t'/(2a \cdot b)\}+[1+\{(b-a) \cdot y \cdot \sin t/(a \cdot b)\}-\{y^2/(a \cdot b)\}-\{4a \cdot b \cdot \cos^2 t+(a+b)^2 \sin^2 t\}x^2/(4a^2 b^2 \cos^2 t)]^{1/2}],$$

so that $$z=A/B+C_{02}y^2+C_{20}x^2+C_{03}y^3+C_{21}x^2y+C_{04}y^4+C_{22}x^2y^2+C_{40}x^4.$$

Since the above curved-surface expression contains only even-degree polynomials regarding x, the curved surface expressed by the above curved-surface expression has a shape symmetrical with respect to the Y, Z plane. Further, if the following condition is satisfied, a shape symmetrical with respect to the X, Z plane is obtained:

$$C_{03}=C_{21}=t=0.$$

Further, if the following expression is satisfied, a shape of rotational symmetry is obtained:

$$C_{02}=C_{20}=C_{04}=C_{40}=C_{22}/2.$$

If the above conditions are not satisfied, a shape of rotational asymmetry is obtained.

In each of the embodiments of the present invention, as shown in FIG. 16, the first surface R1 (the entrance side of the optical system) is the stop. A horizontal half-angle of view uY is the maximum angle of view of a light beam incident on the stop R1 in the Y, Z plane of FIG. 16, while a vertical half-angle of view uX is the maximum angle of view of a light beam incident on the stop R1 in the X, Z plane of FIG. 16. The diameter of the stop that is the first surface R1 is shown as an aperture diameter that relates to the brightness of the optical system. Since an entrance pupil is located at the first surface R1, the aperture diameter is equal to the diameter of the entrance pupil.

The effective image area in the image plane is represented by an image size that is represented by a rectangular region having a horizontal size taken in the y direction of the local coordinate system and a vertical size taken in the x direction of the local coordinate system.

Regarding each of the embodiments the constituent data of which are shown herein, the size of its optical system is also shown. The size is determined by the effective ray diameter at the wide-angle end.

Regarding the embodiments that are illustrated together with the constituent data, their respective lateral aberration charts are shown. Each of the lateral aberration charts shows the lateral aberrations of a light beam for the wide-angle end (W), the middle position (M) and the telephoto end (T), and the lateral aberrations are those of the light beam that is incident on the stop R1 at an angle of incidence that is defined by a horizontal angle of incidence and a vertical angle of incidence which are (uY, uX), (0, uX), (−uY, uX), (uY, 0), (0, 0) and (−uY, 0), respectively. In each of the lateral aberration charts, the horizontal axis represents the height of incidence on the pupil, and the vertical axis represents the amount of aberration. In any of the embodiments, since each of the surfaces basically has a shape symmetrical with respect to the Y, Z plane, the plus and minus directions of a vertical angle of view are the same in the lateral aberration chart. For this reason, the lateral aberration chart in the minus direction is omitted for the sake of simplicity.

Preferred embodiments will be described below.

First Embodiment

Figure 1:
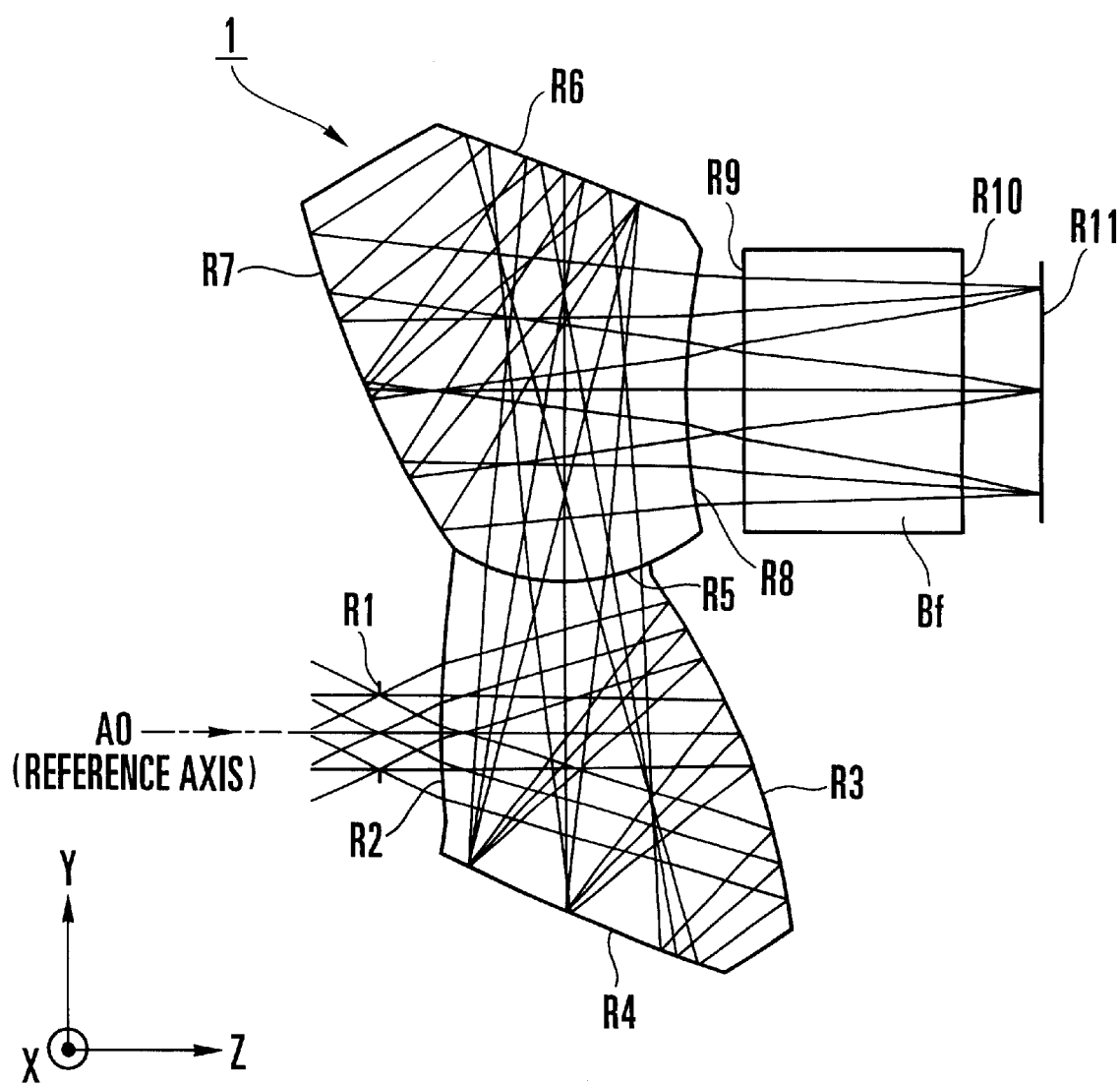
FIG. 1 is a view showing an optical cross section taken on a Y, Z plane, of a first embodiment of the present invention.

FIG. 1 is a cross-sectional view, taken on the Y, Z plane, of the optical system of a photographing optical system employing an optical unit according to a first embodiment of the present invention. The first embodiment is a photographing optical system that has a horizontal angle of view of 52.6 degrees and a vertical angle of view of 40.6 degrees. FIG. 1 also shows the optical path of the photographing optical system. Constituent data for the first embodiment are shown below.

| HORIZONTAL HALF-ANGLE OF VIEW | 26.3 |
| VERTICAL HALF-ANGLE OF VIEW | 20.3 |
| APERTURE DIAMETER | 1.36 |
| IMAGE SIZE | HORIZONTAL 3.8 mm × VERTICAL 2.9 mm |
| SIZE OF OPTICAL SYSTEM (X × Y × Z) = | 6.8 × 15.1 × 13.4 |
| | AT WIDE-ANGLE END |

| i | Yi | Zi | θi | Di | Ndi | vdi | |
|---|---|---|---|---|---|---|---|
| 1 | 0.00 | 0.00 | 0.00 | 1.10 | 1 | | STOP |
| 2 | 0.00 | 1.10 | 0.00 | 5.50 | 1.48749 | 70.21 | REFRACTING SURFACE |
| 3 | 0.00 | 6.60 | 22.50 | 4.60 | 1.48749 | 70.21 | REFLECTING SURFACE |
| 4 | −3.25 | 3.35 | 67.50 | 6.00 | 1.48749 | 70.21 | REFLECTING SURFACE |
| 5 | 2.75 | 3.35 | 90.00 | 7.50 | 1.64850 | 53.03 | REFRACTING SURFACE |
| 6 | 10.25 | 3.35 | 69.00 | 5.40 | 1.64850 | 53.03 | REFLECTING SURFACE |
| 7 | 6.23 | −0.27 | 24.00 | 5.80 | 1.64850 | 53.03 | REFLECTING SURFACE |
| 8 | 6.23 | 5.53 | 0.00 | 1.10 | 1 | | REFRACTING SURFACE |
| 9 | 6.23 | 6.63 | 0.00 | 4.00 | 1.51633 | 64.15 | REFRACTING SURFACE |
| 10 | 6.23 | 10.63 | 0.00 | 1.45 | 1 | | REFRACTING SURFACE |
| 11 | 6.23 | 12.09 | 0.00 | | 1 | | IMAGE PLANE |

SPHERICAL SHAPE

| R2 | $r_2$ = | 16.410 |
| R5 | $r_5$ = | 3.551 |
| R8 | $r_8$ = | 11.434 |
| R9 | $r_9$ = | ∞ |
| R10 | $r_{10}$ = | ∞ |

ASPHERICAL SHAPE

| R3 | C02 = | −4.08802e−02 | C20 = | −4.76364e−02 | | |
| | C03 = | −5.78739e−05 | C21 = | −1.51169e−03 | | |
| | C04 = | 2.17086e−04 | C22 = | 4.30933e−04 | C40 = | 2.85734e−05 |
| R4 | C02 = | 8.021425e−03 | C20 = | 2.66878e−02 | | |
| | C03 = | 1.27026e−03 | C21 = | −2.85143e−04 | | |
| | C04 = | 5.53318e−04 | C22 = | 1.36027e−04 | C40 = | −1.37098e−04 |
| R6 | C02 = | −6.06400e−03 | C20 = | −1.23655e−02 | | |
| | C03 = | 1.37927e−03 | C21 = | 1.40444e−03 | | |
| | C04 = | 2.32031e−04 | C22 = | 2.10725e−05 | C40 = | 9.68935e−05 |
| R7 | C02 = | 2.60879e−02 | C20 = | 2.72025e−02 | | |
| | C03 = | 5.09584e−04 | C21 = | 6.06834e−04 | | |
| | C04 = | 1.21312e−04 | C22 = | 9.22239e−05 | C40 = | 4.84790e−05 |

Referring to FIG. 1, an optical unit 1 has a plurality of curved reflecting surfaces, and a plurality of refracting surfaces on its surface and in its interior, and is made of a transparent material such as glass. A convex refracting surface (entrance surface) R2 having a positive refractive power, concave reflecting surfaces R3 and R4, a positive refractive power, concave reflecting surfaces R6 and R7, and a concave refracting surface (exit surface) R8 having a negative refractive power are formed on the surface of or in the interior of the optical unit 1 in the order of passage of a light beam from an object. A stop member (entrance pupil) R1 is disposed on the object side of the optical unit 1, and an optical correcting plate Bf (including the surfaces R9 and R10) is composed of a quartz low-pass filter, an infrared cut filter or the like. The image pickup surface of an image pickup element (image pickup medium) such as a CCD is positioned in a final image forming plane R11. An axis A0 is a reference axis of the optical unit (photographing optical system) 1.

Incidentally, each of the three refracting surfaces R2, R5 and R8 is a spherical surface of rotational symmetry, and each of all the reflecting surfaces has a surface shape having curvature varying according to azimuth angles, and is an anamorphic surface that is symmetrical with respect to the Y, Z plane.

An image forming operation in the first embodiment will be described below. A light beam from the object passes through the stop R1 while being restricted to a required amount of incidence by the stop R1, and is then made incident on the entrance surface R2 of the optical unit 1. The light beam that has passed through the entrance surface R2 is reflected by the surfaces R3 and R4 in that order and temporarily forms an image in the vicinity of the surface R4. Then, after having passed through the cemented refracting surface R5, the light beam is reflected by the surfaces R6 and R7 in that order and exits from the exit surface R8 and again forms an image on the final image forming plane R11 through the optical correcting plate Bf. An object ray forms an intermediate image between the surfaces R4 and R5, and a pupil ray forms an intermediate image between the surfaces R5 and R6.

Incidentally, the refracting surface R5 provided in the interior of the optical unit 1 is a cemented surface at which different media are cemented together, and serves to correct chromatic aberration due to the entrance and exit refracting surfaces R2 and R8.

In the first embodiment, the direction of the reference axis A0 that enters the optical unit 1 is parallel to and the same as the direction of the reference axis that exits from the optical unit 1. All the reference axes that contain the entering reference axis and the exiting reference axis lie on the surface of the sheet of FIG. 1 (in the Y, Z plane).

In this manner, the optical unit 1 functions as a lens unit that has desired optical performance (image forming performance) and a positive refractive power as a whole owing to refractive powers due to the entering and exiting refracting surfaces and the internal refracting surface and refractive powers due to the plurality of curved reflecting mirrors (surfaces) provided in the interior of the optical unit 1.

In the first embodiment, focusing toward an object lying at a close distance is effected by moving the entire optical unit 1 with respect to the image pickup surface R11 of the image pickup element. Specifically, in the first embodiment, the direction of the reference axis A0 that enters the optical unit 1 is parallel to and the same as the direction of the reference axis that exits from the optical unit 1 that constitutes the entire optical system, and a focusing operation can be effected similarly to a conventional lens system by moving the entire optical unit 1 in parallel with the direction (the Z-axis direction) of the exiting reference axis.

Figure 2:
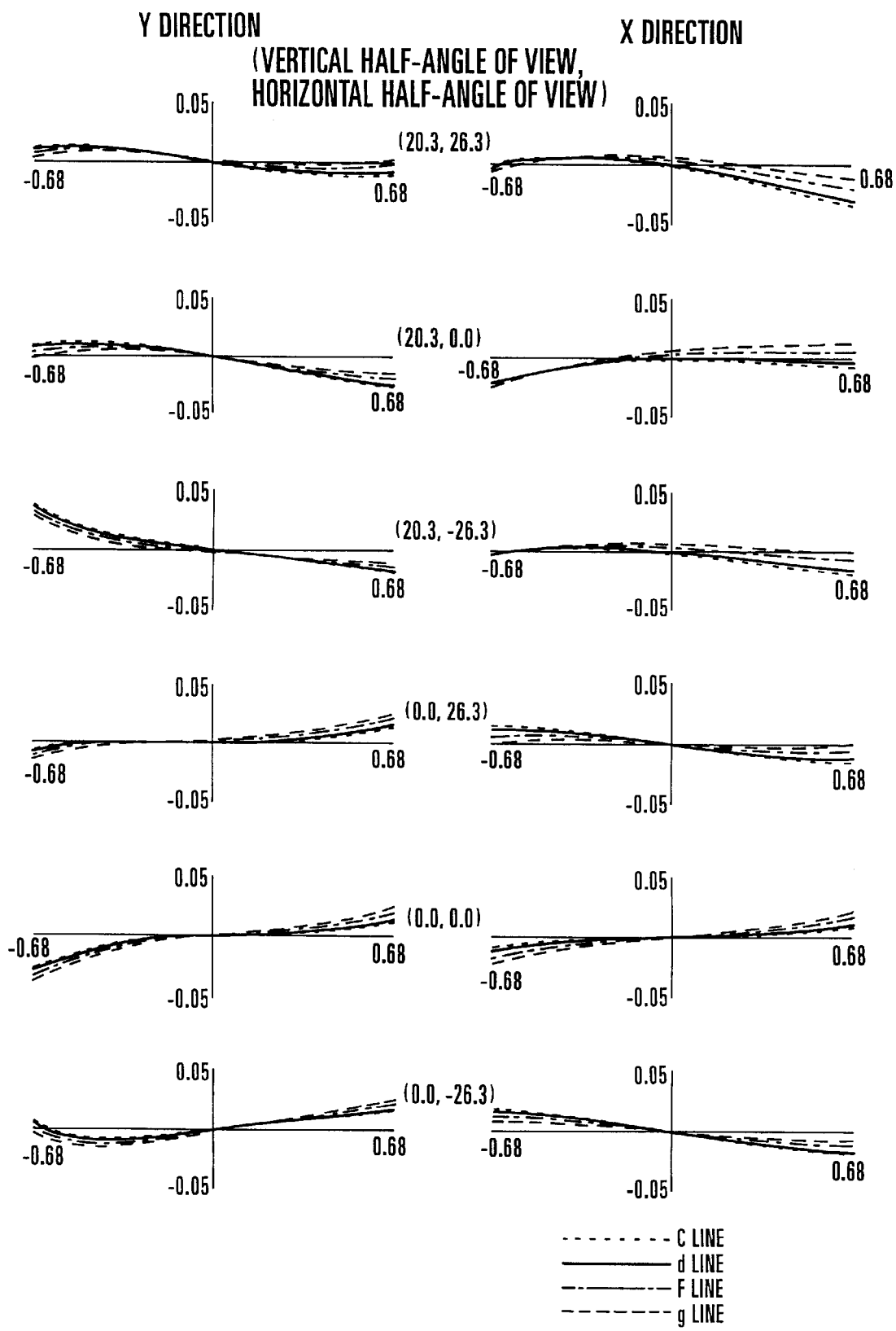
FIG. 2 shows lateral aberration charts of the first embodiment.

FIG. 2 shows lateral aberration charts of the photographing optical system according to the first embodiment shown in FIG. 1. In each of the lateral aberration charts, a dotted line corresponds to a C line, a solid line corresponds to a d line, a one-dot chained line corresponds to an F line, and a dashed line corresponds to a g line. As can be seen from FIG. 2, according to the first embodiment, it is possible to achieve well-balanced correction of aberrations, including chromatic aberration.

Although in the first embodiment all the three refracting surfaces are formed as surfaces having curvatures, some of the refracting surfaces may be designed as plane surfaces because even a plane refracting surface having a curvature of "0" has the function of refracting a light beam and varying the aberration thereof. For this reason, such a plane refracting surface is not departed from the gist of the present invention.

All the four reflecting surfaces that are integrally formed in the first embodiment are reflecting surfaces having curvatures, but it may be convenient to design the four reflecting surfaces so that they include a plane reflecting surface that varies only the direction of a light beam in a manner similar to a normal prism, for the convenience of the design of the entering or exiting direction. Accordingly, an arrangement in which part of a plurality of reflecting surfaces, which are in general integrally formed is a plane reflecting surface, which varies only the direction of a light beam, does not depart from the gist of the present invention.

Second Embodiment

Figure 3:
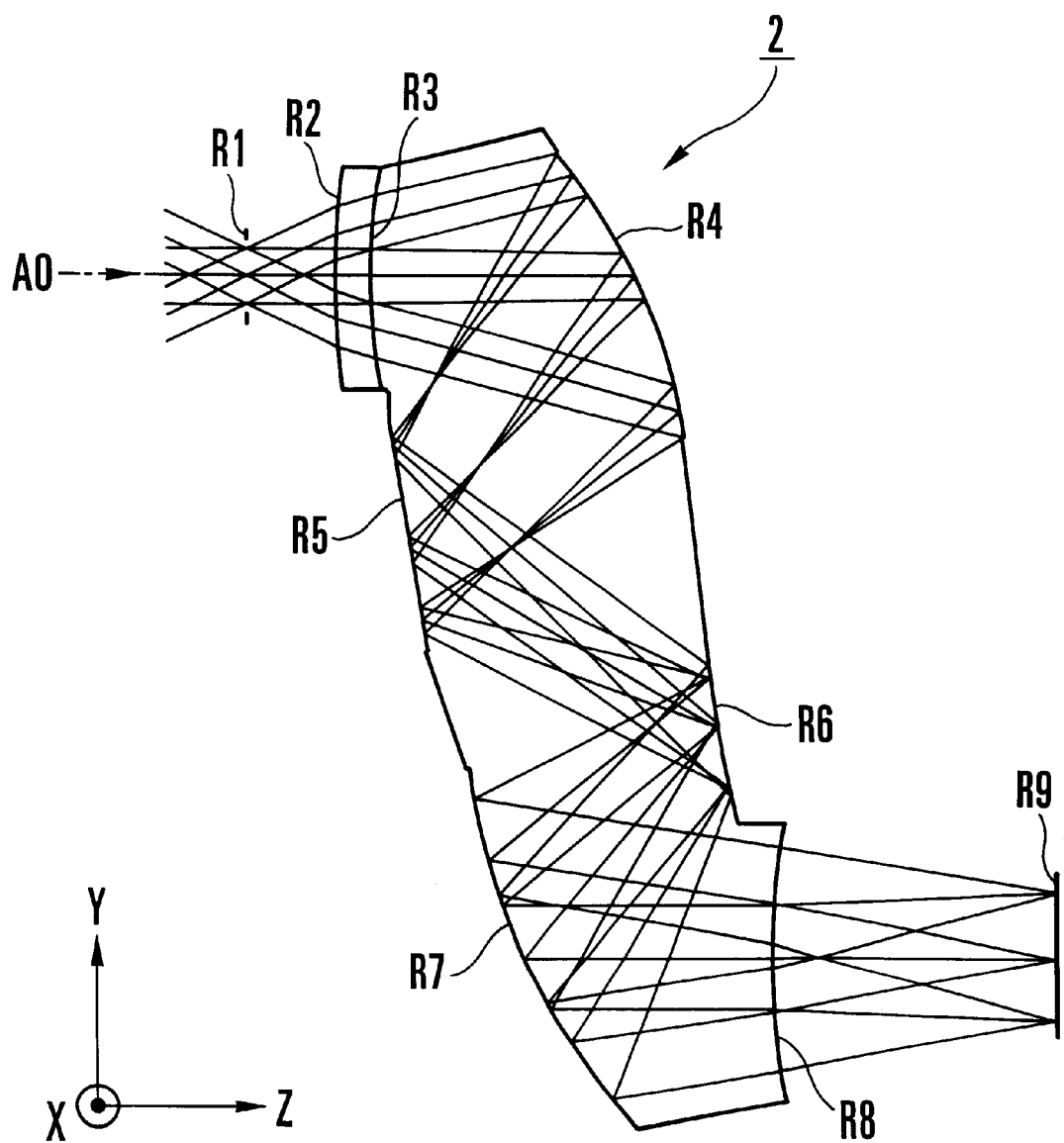
FIG. 3 is a view showing an optical cross section taken on a Y, Z plane, of a second embodiment of the present invention.

FIG. 3 is a cross-sectional view, taken on the Y, Z plane, of the optical system of a photographing optical system employing an optical unit according to a second embodiment of the present invention. The second embodiment is a photographing optical system that has a horizontal angle of view of 52.6 degrees and a vertical angle of view of 40.6 degrees. FIG. 3 also shows the optical path of the photographing optical system. Constituent data for the second embodiment are shown below.

| | | | | | | |
|---|---|---|---|---|---|---|
| HORIZONTAL HALF-ANGLE OF VIEW | | | 26.3 | | | |
| VERTICAL HALF-ANGLE OF VIEW | | | 20.3 | | | |
| APERTURE DIAMETER | | | 1.60 | | | |
| IMAGE SIZE | | | HORIZONTAL 3.6 mm × VERTICAL 2.7 mm | | | |
| SIZE OF OPTICAL SYSTEM (X × Y × Z) = | | | 7.0 × 27.0 × 26.3 | | | |
| | | | AT WIDE-ANGLE END | | | |
| i | Yi | Zi | θi | Di | Ndi | νdi |
| 1 | 0.00 | 0.00 | 0.00 | 2.50 | 1 | | STOP |
| 2 | 0.00 | 2.50 | 0.00 | 1.00 | 1.49171 | 57.40 | REFRACTING SURFACE |

-continued

| | | | | | | | |
|---|---|---|---|---|---|---|---|
| 3 | 0.00 | 3.50 | 0.00 | 7.50 | 1.62000 | 60.30 | REFRACTING SURFACE |
| 4 | 0.00 | 11.00 | 25.00 | 10.00 | 1.62000 | 60.30 | REFLECTING SURFACE |
| 5 | −7.66 | 4.57 | 10.00 | 10.00 | 1.62000 | 60.30 | REFLECTING SURFACE |
| 6 | −12.66 | 13.23 | 10.00 | 8.50 | 1.62000 | 60.30 | REFLECTING SURFACE |
| 7 | −19.17 | 7.77 | 25.00 | 7.00 | 1.62000 | 60.30 | REFLECTING SURFACE |
| 8 | −19.17 | 14.77 | 0.00 | 8.00 | 1 | | REFRACTING SURFACE |
| 9 | −19.17 | 22.77 | −0.00 | | 1 | | IMAGE PLANE |

SPHERICAL SHAPE

R3  r3 = 16.956
R8  r8 = 22.054

ASPHERICAL SHAPE

| | | | | | | | |
|---|---|---|---|---|---|---|---|
| R2 | a = | 1.68198e+01 | b = | 1.68198e+01 | t = | 0.00000e+00 | |
| | C03 = | 0.00000e+00 | C21 = | 0.00000e+00 | | | |
| | C04 = | −1.63283e−03 | C22 = | −3.26566e−03 | C40 = | −1.63283e−03 | |
| | C05 = | 0.00000e+00 | C23 = | 0.00000e+00 | C41 = | 0.00000e+00 | |
| | C06 = | 6.88192e−05 | C24 = | 2.06458e−04 | C42 = | 2.06458e−04 | |
| | C60 = | 6.88192e−05 | | | | | |
| R4 | C02 = | −2.60847e−02 | C20 = | −2.00057e−02 | | | |
| | C03 = | 1.82348e−04 | C21 = | −4.11635e−04 | | | |
| | C04 = | −5.36581e−05 | C22 = | −5.93768e−05 | C40 = | 3.88625e−05 | |
| R5 | C02 = | 1.96297e−03 | C20 = | 2.33195e−02 | | | |
| | C03 = | 1.34065e−03 | C21 = | −6.78866e−06 | | | |
| | C04 = | −1.12659e−04 | C22 = | 3.50150e−05 | C40 = | 2.00089e−04 | |
| R6 | C02 = | 1.12434e−02 | C20 = | 9.29122e−02 | | | |
| | C03 = | 2.27794e−03 | C21 = | 9.79180e−03 | | | |
| | C04 = | 3.17492e−04 | C22 = | 1.85006e−03 | C40 = | 2.78310e−03 | |
| R7 | C02 = | 2.71719e−02 | C20 = | 4.05540e−02 | | | |
| | C03 = | 2.43705e−04 | C21 = | 1.82760e−04 | | | |
| | C04 = | 3.17364e−05 | C22 = | 9.85387e−05 | C40 = | 7.32826e−05 | |

Referring to FIG. 3, an optical unit 2 has a plurality of curved reflecting surfaces, and a plurality of refracting surfaces on its surface and in its interior, and is made of a transparent material such as glass. A convex refracting surface (entrance surface) R2 having a positive refractive power, a convex refracting surface (cemented surface) R3 having a positive refractive power, concave reflecting surfaces R4 and R5, a convex reflecting surface R6, a concave reflecting surface R7, and a concave refracting surface (exit surface) R8 having a negative refractive power are formed on the surface of or in the interior of the optical unit 2 in the order of passage of a light beam from an object. A stop (entrance pupil) R1 is disposed on the object side of the optical unit 2, and the image pickup surface of an image pickup element (image pickup medium), such as a CCD, is positioned in a final image forming plane R9. An axis A0 is a reference axis of the optical unit 2.

Incidentally, each of the three refracting surfaces R2, R3 and R8 is a surface of rotational symmetry, and, especially, the refracting surfaces R3 and R8 are spherical surfaces. All the reflecting surfaces are anamorphic surfaces that are symmetrical with respect to the Y, Z plane.

An image forming operation in the second embodiment will be described below. A light beam from the object passes through the stop R1 while being restricted to a required amount of incidence by the stop R1, and is then made incident on the entrance surface R2 of the optical unit 2. The light beam passes through the entrance surface R2, and after having passed through the cemented refracting surface R3, the light beam is reflected by the surface R4 and temporarily forms an image in the vicinity of the surface R5. Then, the light beam is reflected by the surfaces R5, R6 and R7 in that order and exits from the exit surface R8 and again forms an image on the final image forming plane R9. An object ray forms an intermediate image between the surfaces R4 and R5, and a pupil ray forms an intermediate image in the vicinity of the surface R6.

Incidentally, the refracting surface R3 provided in the interior of the optical unit 2 serves to correct chromatic aberration due to the entrance and exit refracting surfaces R2 and R8. In addition, the entrance refracting surface R2, which is provided in the vicinity of the internal refracting surface R3, can be realized by cementing the surface R2 to a block of uniform refractive index consisting of the refracting surfaces R3 to R8, as by a replica molding technique, so that the second embodiment can provide an arrangement that is suited to mass production as compared with a normal cementing method. Incidentally, in the second embodiment, the surface R2 is formed as an aspherical surface because aspherical surfaces can be designed to have far higher optical performance than spherical surfaces. In addition, since the surface R2 is an aspherical surface, if the cemented surface R3 is formed as a spherical surface or a plane surface (in the second embodiment, a spherical surface), the surface R3 can be used as a reference for measurement of the accuracy of other aspherical refracting and reflecting surfaces, unlike an arrangement in which the surfaces R2 to R8 are formed as one unit of uniform refractive index. Accordingly, the arrangement of the second embodiment is suitable for forming the optical unit 2 with high accuracy.

Although in the second embodiment the entrance refracting surface R2 is provided in the vicinity of the internal refracting surface R3, such an internal refracting surface may be disposed in the vicinity of the exit refracting surface, particularly if the exit refracting surface is an aspherical surface. If both of the entrance and exit surfaces are aspherical surfaces, a plurality of internal refracting surfaces may be provided in such a manner that one of the internal refracting surfaces is disposed in the vicinity of the entrance surface and another is disposed in the vicinity of the exit surface.

In the second embodiment, the direction of the reference axis A0 that enters the optical unit 2 is parallel to and the same as the direction of the reference axis which exits from the optical unit 2. All the reference axes that contain the entering reference axis and the exiting reference axis lie on the surface of the sheet of FIG. 3 (in the Y, Z plane).

In this manner, the optical unit 2 functions as a lens unit that has desired optical performance (image forming performance) and a positive refractive power as a whole owing to refractive powers due to the entering and exiting refracting surfaces and the internal refracting surface and refractive powers due to the plurality of curved reflecting mirrors (surfaces) provided in the interior of the optical unit 2.

In the second embodiment, focusing toward an object lying at a close distance is effected by moving the entire optical unit 2 with respect to the image pickup surface R11 of the image pickup element. Specifically, in the second embodiment, the direction of the reference axis A0 that enters the optical unit 2 is parallel to and the same as the direction of the reference axis which exits from the optical unit 2, which constitutes the entire optical system, and a focusing operation can be effected similarly to a conventional lens system by moving the entire optical unit 2 in parallel with the direction (the Z-axis direction) of the exiting reference axis.

Figure 4:
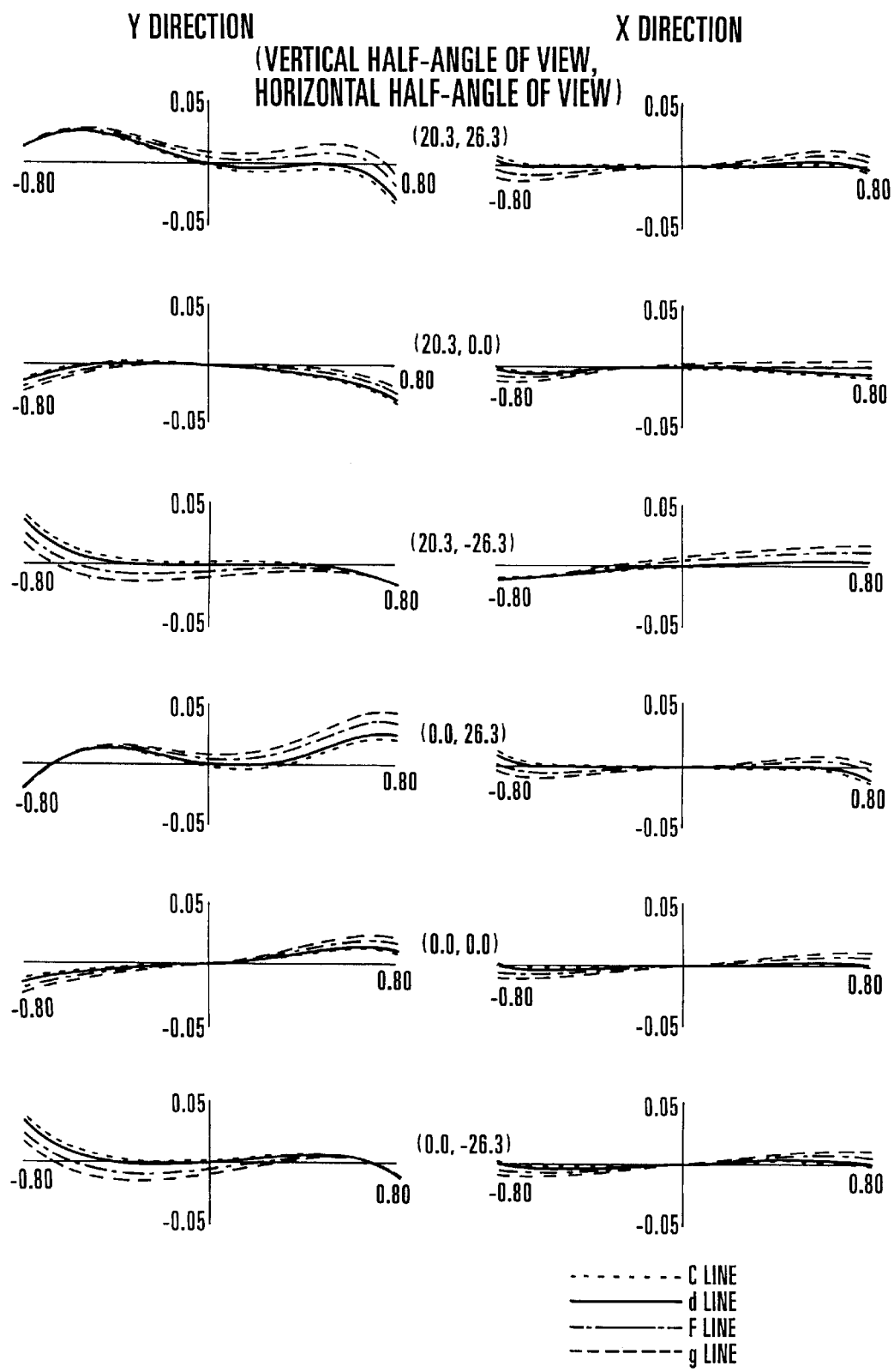
FIG. 4 shows lateral aberration charts of the second embodiment.

FIG. 4 shows lateral aberration charts of the optical system according to the second embodiment shown in FIG. 3. In each of the lateral aberration charts, a dotted line corresponds to a C line, a solid line corresponds to a d line, a one-dot chained line corresponds to an F line, and a dashed line corresponds to a g line. As can be seen from FIG. 4, according to the second embodiment, it is possible to achieve well-balanced correction of aberrations including chromatic aberration.

Although in the second embodiment all the three refracting surfaces are formed as surfaces having curvatures, some of the refracting surfaces may be designed as plane surfaces because even a plane refracting surface having a curvature of "0" has the function of refracting a light beam and varying the aberration thereof. For this reason, such a plane refracting surface does not depart from the gist of the present invention.

All the four reflecting surfaces that are integrally formed in the second embodiment are reflecting surfaces having curvatures, but it may be convenient to design the four reflecting surfaces so that they include a plane reflecting surface that varies only the direction of a light beam in a manner similar to a normal prism, for the convenience of the design of the entering or exiting direction. Accordingly, an arrangement in which part of a plurality of reflecting surfaces, which are in general integrally formed is a plane reflecting surface, which varies only the direction of a light beam, does not depart from the gist of the present invention.

In the second embodiment, since the entrance or exit surface is an aspherical surface, the internal refracting surface is formed as a spherical or plane surface that is easy to produce and that can be used as a reference surface for measurement, and the refractive indices before and behind the cemented internal refracting surface are made different to increase the degree of freedom of aberration correction. However, as long as aberration correction is possible, media having different refractive indices need not necessarily be cemented together to form the entrance or exit refracting surface as an aspherical surface. Accordingly, an arrangement in which the refractive indices before and behind a cemented internal refracting surface are the same and no refraction occurs at the cemented internal refracting surface broadly does not depart from the gist of the present invention.

Each embodiment, which will be described below, relates to a reflecting type of zoom optical system using a plurality of optical units, each of which is similar to the optical unit according to either of the first and second embodiments, as well as to an image pickup apparatus using such reflecting type of zoom optical system. Third to sixth embodiments are qualitative embodiments, the constituent data of which are not shown herein, while the constituent data of a seventh embodiment is shown herein. Incidentally, in each of the third to sixth embodiments, surface symbols or the like are attached to each constituent optical unit, independently of the above-described nomenclature. Specifically, a stop is denoted by BL and a final image plane is denoted by P, and the surfaces of the M-th optical unit are respectively denoted by Rm,1, Rm,2, . . . , Rm,n in that order as viewed from the first surface.

Third Embodiment

Figure 5:
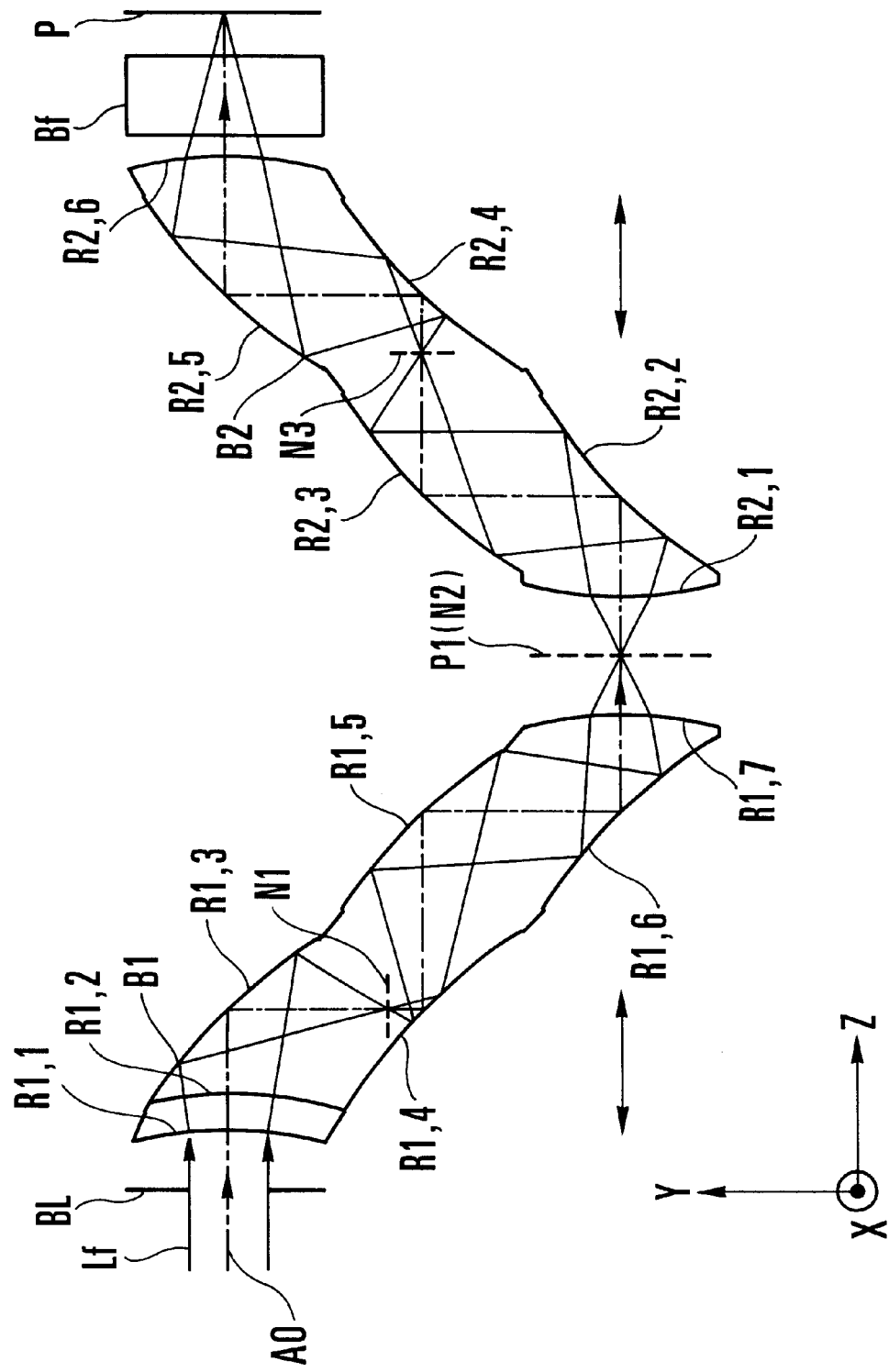
FIG. 5 is a diagrammatic view of the essential portion of a third embodiment of the present invention.

FIG. 5 is a schematic view of the essential portion of a zoom optical system according to the third embodiment of the present invention. The third embodiment is intended for a two-optical-unit type of zoom optical system which performs a variation of magnification (zooming) by changing the relative positional relationship between two optical units. The zoom optical system shown in FIG. 5 includes a first optical unit B1 and a second optical unit B2 each having a plurality of curved reflecting surfaces. The first optical unit B1 includes a concave refracting surface R1,1, an internal refracting surface R1,2, four reflecting surfaces, i.e., a concave mirror R1,3, a convex mirror R1,4, a concave mirror R1,5 and a convex mirror R1,6, and a convex refracting surface R1,7 in that order as viewed from the object side. The direction of the reference axis A0 that enters the first optical unit B1 and the direction of the reference axis that exits from the first optical unit B1 are parallel to and the same as each other.

The second optical unit B2 includes a convex refracting surface R2,1, four reflecting surfaces, i.e., a convex mirror R2,2, a concave mirror R2,3, a convex mirror R2,4 and a concave mirror R2,5, and a convex refracting surface R2,6 in that order as viewed from the object side. Similarly to the first optical unit B1, the direction of the reference axis A0 that enters the second optical unit B2 and the direction of the reference axis that exits from the second optical unit B2 are parallel to and the same as each other.

The zoom optical system shown in FIG. 5 also includes an optical correcting plate Bf that employs a parallel-plane plate and is composed of a low-pass filter made of a quartz material, an infrared cut filter or the like.

The zoom optical system shown in FIG. 2 also includes an image pickup element surface P that serves as the final image plane, such as the image pickup surface of a CCD (image pickup medium), and the stop BL, which is disposed on the object side of the first optical unit B1 (the light-beam entrance side of the optical system). In FIG. 5, symbol A0 denotes the reference axis of the zoom optical system.

The first optical unit B1 and the second optical unit B2 are constituent elements of the two-optical-unit type zoom optical system.

The image forming action of the third embodiment will be described below. A light beam Lf from an object passes through the stop BL while being restricted to a required amount of incidence by the stop BL, and is then made incident on the concave refracting surface R1,1 of the first optical unit B1. The internal refracting surface R1,2 is an internal refracting surface of the type used in the second embodiment, and is used as a reference surface for integrally forming the entrance refracting surface R1,1, as by replica molding, and is normally formed as a spherical surface or a plane surface. If the entrance refracting surface R1,l is formed as an aspherical surface, the first optical unit B1 and the entire optical system can be corrected for aberration.

The light beam, which has been refracted by and passed through the concave refracting surfaces R1,1 and R1,2, is reflected from the concave mirror R1,3 toward a primary image-forming plane N1. Thus, an image of the object is formed on the primary image-forming plane N1 by the power of the concave mirror R1,3.

By temporarily forming the image of the object in the first optical unit B1 in this manner, it is possible to effectively suppress an increase in the effective ray diameter of each surface disposed on the image side of the stop BL.

The light beam that has formed such primary image on the primary image forming plane N1 is repeatedly reflected by the convex mirror R1,4, the concave mirror R1,5 and the convex mirror R1,6 in that order while undergoing convergence or divergence due to the power of each of these reflecting mirrors. When the light beam reaches the convex refracting surface R1,7, the light beam is refracted by the convex refracting surface R1,7 and forms the object image on a secondary image forming plane N2. The secondary image forming plane N2 is an image-forming plane P1 of the entire first optical unit B1.

As described above, the first optical unit B1 functions as a lens unit that is provided with desired optical performance and has a positive power as a whole, owing to the refractions by the entrance and exit surfaces and the internal refracting surface and the repeated reflections by the plurality of curved reflecting mirrors.

The light beam from the object image formed on the image forming plane P1 (the secondary image forming plane N2) of the entire first optical unit B1 passes through the convex refracting surface R2,1 of the second optical unit B2, and then forms the object image on a ternary image forming plane N3 via the convex mirror R2,2 and the concave mirror R2,3.

For a reason similar to the reason why the object image is formed in the first optical unit B1, the above-described step is effective for suppressing an increase in the effective ray diameter of each surface in the second optical unit B2.

The light beam that has formed the image on the ternary image forming plane N3 is repeatedly reflected by the convex mirror R2,4 and the concave mirror P2,5 in that order while undergoing the influence of the power of each of these reflecting mirrors. When the light beam reaches the convex refracting surface R2,6, the light beam is refracted by the convex refracting surface R2,6 and passes through the optical correcting plate Bf to form the object image on the image pickup element surface P.

As described above, the second optical unit B2 is arranged to again form on the image-pickup-element surface P the object image formed on the image-forming plane P1 (the secondary image forming plane N2) of the entire first optical unit B1 by the first optical unit B1, and, similarly to the first optical unit B1, functions as a lens unit that is provided with desired optical performance and has a positive power as a whole, owing to the refractions by the entrance and exit surfaces and the repeated reflections by the plurality of curved reflecting mirrors.

Figures 6A, 6B:
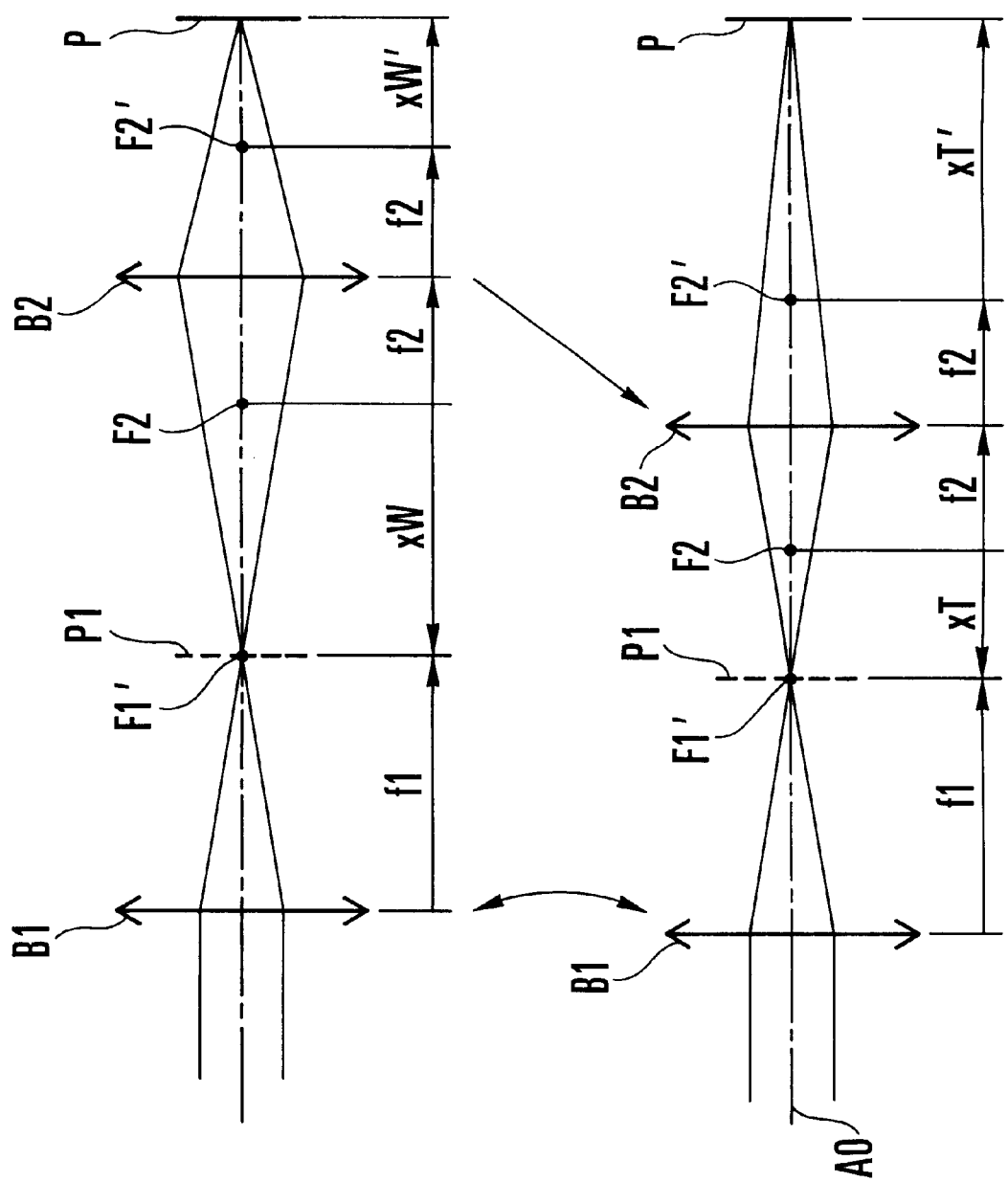
FIGS. 6(A) and 6(B) are explanatory views aiding in explaining the magnification-varying operation of the third embodiment.

In the third embodiment, the focal length (image-forming magnification) of the entire optical system is varied by relatively moving the first and second optical units B1 and B2 with respect to the image pickup element surface (image forming plane) P. (This operation is called "variation of magnification" or "zooming".) The magnification-varying operation will be described below with reference to FIGS. 6(A) and 6(B). FIGS. 6(A) and 6(B) are optical layout views each showing the first and second optical units B1 and B2 of the third embodiment in the form of single thin lenses, and show different states in which the zoom optical system is developed with respect to the reference axis A0. Incidentally, FIG. 6(A) is a layout view of the state in which the optical system is set to the wide-angle end (W), while FIG. 6(B) is a layout view of the state in which the optical system is set to the telephoto end (T). In FIGS. 6(A) and 6(B), f1 represents the focal length of the first optical unit B1, f2 represents the focal length of the second optical unit B2, xW(−) represents the distance from a front focal point F2 of the second optical unit B2 to the image-forming plane P1 (the secondary image-forming plane N2) of the entire first optical unit B1 with the optical system being set to the wide-angle end (W), and xW' represents the distance from a rear focal point F2' of the second optical unit B2 to the image-forming plane P with the optical system being set to the wide-angle end (W). (The respective characters W and T refer to a value that indicates that the optical system is set to the wide-angle end and a value that indicates that the optical system is set to the telephoto end, respectively.)

From Newton's formula for image formation, if $$xW*xW'=-f2^2$$

is satisfied, an image-forming magnification β2W of the second optical unit B2 becomes:

$$\beta 2W = -(xW'/+f2)/(-xW+f2) \quad (1)$$
$$= f2/xW$$
$$= -xW'/f2,$$

and also a focal length fW of the entire optical system at the wide-angle end becomes:

$$fW = f1*\beta 2W \quad (2)$$
$$= f1*f2/xW$$

Thus, if the second optical unit B2 moves while satisfying Newton's formula for image formation and the first optical unit B1 moves to correct the positional variation of the intermediate image-forming plane P1 due to the movement of the second optical unit B2, the optical system varies the focal length without varying the final image-forming position P.

Suppose that the second optical unit B2 has moved by a predetermined amount and the optical system has shifted from the wide-angle end (W) to the telephoto end (T). Let xT(−) be the distance from the front focal point F2 of the second optical unit B2 to the image-forming plane P1 of the entire first optical unit B1, and let xT' be the distance from the rear focal point F2' of the second optical unit B2 to the image forming plane P. An image-forming magnification β2T of the second optical unit B2 becomes:

$$\beta 2T = (xT^* + f2)/(-xT + f2) \quad (3)$$

$$= f2/xT$$

$$= -xT^*/f2,$$

and also a focal length fT of the entire optical system at the telephoto end becomes:

$$fT = f1 * \beta 2T \quad (4)$$

$$= f1 * f2/xT$$

Therefore, a magnification-variation ratio Z of the optical system becomes:

$$Z = fT/fW \quad (5)$$

$$= xW/xT.$$

Accordingly, the optical system is able to vary the focal length (image-forming magnification) without varying the final image-forming position P, by varying the positional relationship between the first optical unit B1 and the second optical unit B2 and that between the second optical unit B2 and the final image-forming position P.

Although focusing in the third embodiment can be achieved by moving an arbitrary optical unit that constitutes part of the optical system, it is preferable to move an optical unit of lightest weight, in terms of the load of a focusing actuator.

In addition, if the amount of movement of the optical unit is to be fixed with respect to the distance to an object to be photographed, irrespective of the variation of magnification, it is preferable to move the first optical unit B1 disposed at a location closest to the object side.

Incidentally, if the second optical unit B2 that moves during the variation of magnification is arranged to move during focusing as well, both the focusing actuator and a magnification-varying actuator can be achieved as a common arrangement.

The effects and advantages of the third embodiment will be described below.

In the third embodiment, since the reflecting surfaces that move during a variation of magnification are realized in the form of one optical unit, it is possible to guarantee the accuracy of the relative positions between the respective reflecting surfaces that require the highest position accuracy in conventional mirror optical systems. Accordingly, in the third embodiment, it is only necessary to ensure the position accuracy between the first optical unit B1 and the second optical unit B2, and, hence, the position accuracy may be similar to that of a moving optical unit used in a conventional refracting-lens system.

As compared with a refracting-lens system, since each of the optical units is constructed as a lens unit in which a plurality of curved reflecting surfaces are integrally formed, the required number of components of the entire optical system is reduced so that a reduction in the cost of the optical system can be achieved and accumulated errors due to the mounting of other components can be reduced.

By adopting an arrangement that transmits an object image by repeating image formation a plurality of times, the effective ray diameter of each surface can be reduced so that each of the optical units and the entire zoom optical system can be made compact.

Since the image-formation size of an intermediate image forming plane is set to be comparatively small with respect to the size of the image-pickup surface, it is possible to reduce the effective ray diameter of each surface that is required to transmit the object image.

In many conventional zoom optical systems, stops are disposed in their optical systems. If a stop is disposed in the interior of an optical system, there is the problem that as an angle of view increases, a lens disposed on the object side of the stop at a greater distance therefrom requires a greater effective ray diameter.

In the third embodiment, since the stop BL is disposed in the vicinity of the entrance surface of the first optical unit B1 located on the object side of the zoom optical system, the effective ray diameter of the front optical unit of the zoom optical system is prevented from increasing when the focal length of the zoom optical system is shifted to a wide-angle side.

In addition, since the object image is formed in each of the optical units, an increase in the effective ray diameter of each surface disposed on the image side of the stop BL is effectively suppressed.

All the reference axes of the first optical unit B1 and the second optical unit B2 lie in the Y, Z plane.

Fourth Embodiment

Figure 7:
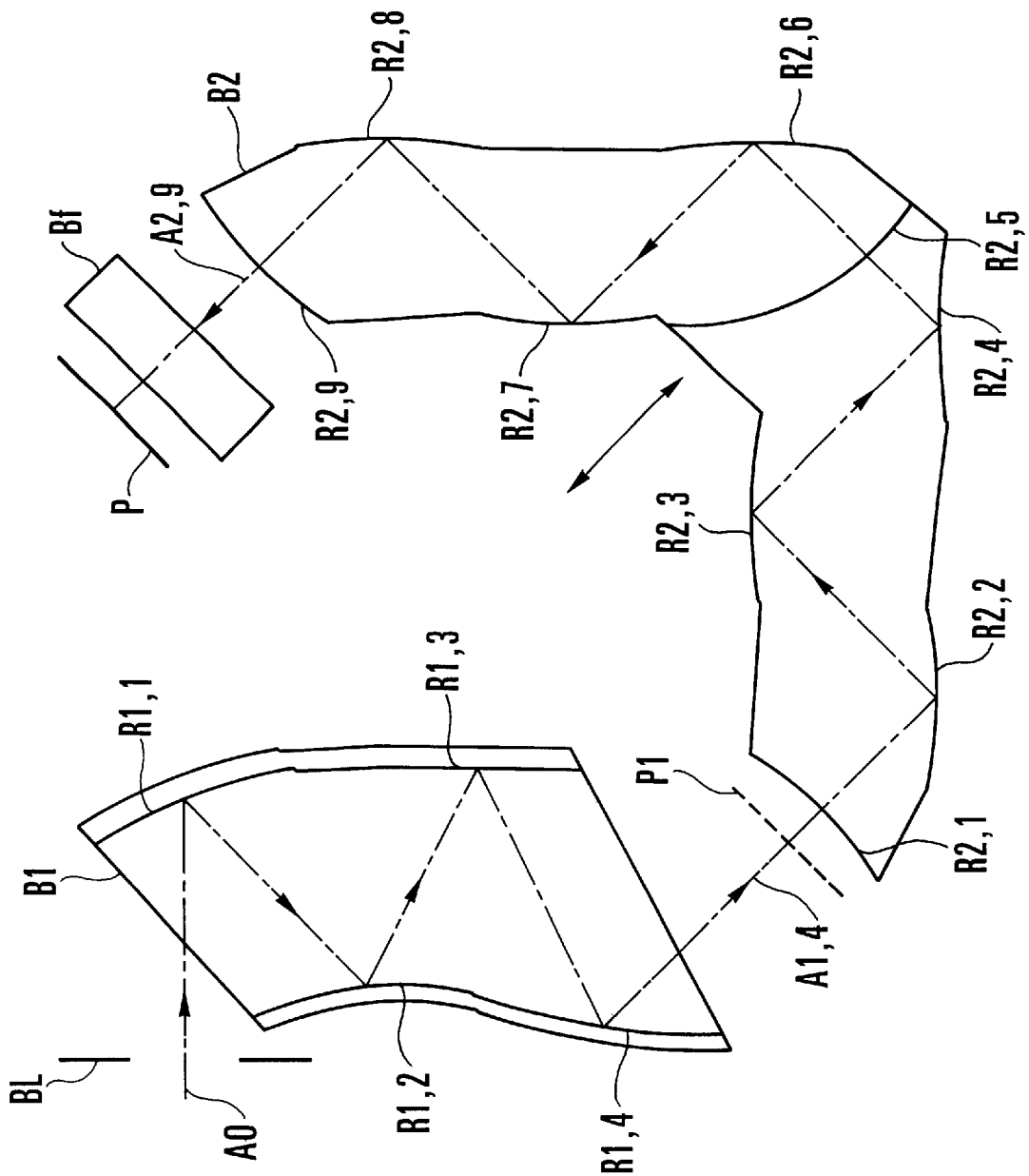
FIG. 7 is a diagrammatic view of the essential portion of a fourth embodiment of the present invention.

FIG. 7 is a schematic view of the essential portion of a zoom optical system according to the fourth embodiment of the present invention. The fourth embodiment is intended for a two-optical-unit type of zoom optical system similar to that shown in FIG. 5. The arrangement of the fourth embodiment is such that the moving directions in which optical units move during a variation of magnification are not parallel to the direction of the entering reference axis A0 of an optical unit disposed at a location closest to the object side.

The zoom optical system shown in FIG. 7 includes a first optical unit B1 and a second optical unit B2, each having a plurality of curved reflecting surfaces. The first optical unit B1 is composed of only a front surface mirror made of plastics, glass, metal or the like (or a rear surface mirror, the front surface of which is coated with an anti-reflection film), and all the reflecting surfaces that constitute the first optical unit B1 are integrally formed in such a manner as to be connected together outside the optical path. The first optical unit B1 includes four reflecting surfaces, i.e., a concave mirror R1,1, a convex mirror R1,2, a plane mirror R1,3 and a concave mirror R1,4 in that order as viewed from the object side, and is a lens unit that has a positive refractive power as a whole. The direction of the reference axis A0 that enters the first optical unit B1 and the direction of a reference axis A1,4 that exits from the first optical unit B1 make an inclination of approximately 45° with respect to each other.

The second optical unit B2 includes a concave refracting surface R2,1, a concave mirror R2,2, a concave mirror R2,3, a convex mirror R2,4, an internal refracting surface R2,5, a concave mirror R2,6, a concave mirror R2,7, a concave mirror R2,8 and a convex refracting surface R2,9 in that order as viewed from the object side. The second optical unit B2 is a lens unit that has a positive refractive power as a whole. The direction of the reference axis A1,4 that enters the second optical unit B2 and the direction of a reference axis A2,9 that exits from the second optical unit B2 are parallel to and opposite to each other.

The zoom optical system shown in FIG. 7 also includes an optical correcting plate Bf that employs a parallel-plane plate and is composed of a quartz low-pass filter, an infrared cut filter or the like.

The zoom optical system shown in FIG. 7 also includes an image-pickup-element surface P that is the image-pickup surface of a CCD (image pickup medium) or the like, and the stop BL, which is disposed on the object side of the first optical unit B1. In FIG. 7, symbol A0 denotes the reference axis of the zoom optical system.

The image-forming action of the fourth embodiment will be described below. A light beam from an object passes through the stop BL while being restricted to a required amount of incidence by the stop BL, and then passes through the inlet of the hollow portion of the first optical unit B1. In the hollow portion, the light beam is repeatedly reflected by the concave mirror R1,1, the convex mirror R1,2, the plane mirror R1,3 and the concave mirror R1,4 in that order while undergoing convergence or divergence due to the power of each of these reflecting mirrors. The light beam that has exited from the outlet of the hollow portion forms an object image on the intermediate image forming plane P1. Incidentally, an intermediate image of the object is temporarily formed in the first optical unit B1 as well.

The light beam from the object image formed on the intermediate image-forming plane P1 passes through the concave refracting surface R2,1 of the second optical unit B2, and is then repeatedly reflected by the concave mirror R2,2, the concave mirror R2,3 and the convex mirror R2,4 and passes through the internal refracting surface R2,5. The internal refracting surface R2,5 is a cemented refracting surface of the type used in the first embodiment, and has the function of correcting chromatic aberration mainly due to the entrance refracting surface R2,1 and the exit refracting surface R2,9 of the second optical unit B2. Then, the light beam, which has passed through the internal refracting surface R2,5, is repeatedly reflected by the concave mirror R2,6, the concave mirror R2,7 and the concave mirror R2,8, and is refracted at the convex refracting surface R2,9 and exits from the second optical unit B2. Incidentally, an intermediate image of the object is temporarily formed in the second optical unit B2 as well.

The light beam that has exited from the second optical unit B2 passes through the optical correcting plate Bf and then forms the object image on the image-pickup-element surface P.

In the fourth embodiment, focusing for different object distances is effected by moving the second optical unit B2 as indicated by the double-headed arrow shown in FIG. 7. At this time, the second optical unit B2 moves in parallel with the direction of the reference axis A1,4 that exits from the first optical unit B1. However, since the direction of the reference axis A0 that enters the first optical unit B1 and the direction of the reference axis A1,4 that exits from the first optical unit B1 make an inclination of approximately 45° with respect to each other, the direction in which the second optical unit B2 moves during focusing is inclined at approximately 45° from the direction of the reference axis A0 that enters the first optical unit B1.

Accordingly, during focusing, the second optical unit B2 moves in parallel with both the direction of the reference axis A1,4 that enters the second optical unit B2 and the direction of a reference axis A2,9 that exits from the second optical unit B2. At the same time, the second optical unit B2 moves with an inclination of approximately 45° with respect to the direction of the reference axis A0 that enters the first optical unit B1.

In the fourth embodiment as well, similarly to the third embodiment, the image-forming magnification of the zoom optical system is varied by relatively moving the first and second optical units B1 and B2 with respect to the image-forming plane P. However, unlike the third embodiment in which the directions in which the reference axis enters and exits from each of the optical units and the moving directions of the respective optical units are all parallel to one another, the direction of the reference axis A0 that enters the first optical unit B13 and the direction of the reference axis A1,4 that exits from the first optical unit B1 make an inclination of approximately 45° with respect to each other. For this reason, during a magnification-varying operation, to maintain the direction of the reference axis that enters the second optical unit B2 from the first optical unit B1, the first optical unit B1 is made to move in parallel with the direction of the entering reference axis of the second optical unit B2.

Fifth Embodiment

Figure 8:
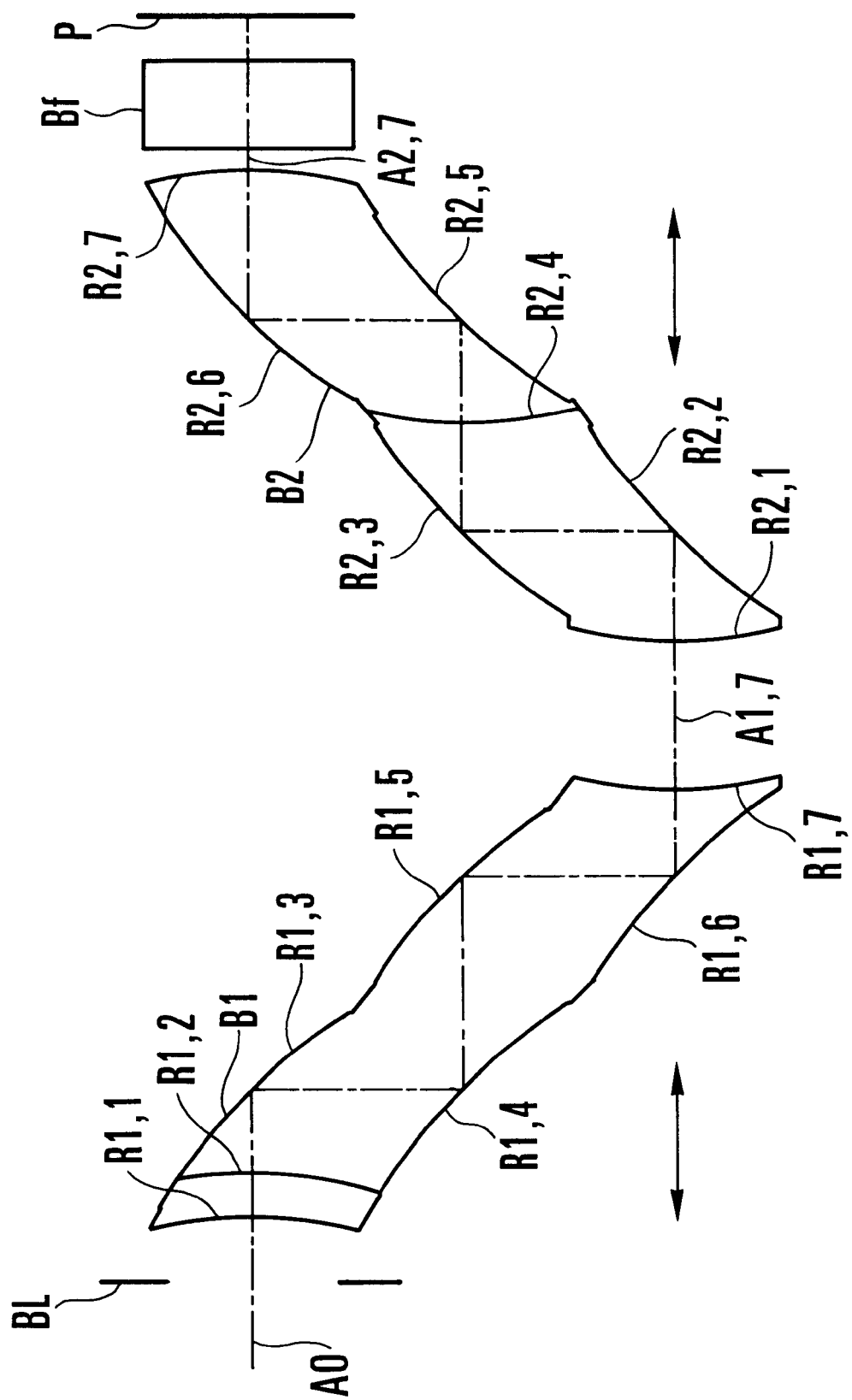
FIG. 8 is a diagrammatic view of the essential portion of a fifth embodiment of the present invention.

FIG. 8 is a schematic view of the essential portion of a zoom optical system according to the fifth embodiment of the present invention. The fifth embodiment is intended for a two-optical-unit type of zoom optical system similar to that shown in FIG. 5. The zoom optical system shown in FIG. 8 includes a first optical unit B1 and a second optical unit B2, each having a plurality of curved reflecting surfaces. The first optical unit B1 includes a concave refracting surface R1,1, an internal refracting surface R1,2, four reflecting surfaces, i.e., a concave mirror R1,3, a convex mirror R1,4, a concave mirror R1,5 and a convex mirror R1,6, and a concave refracting surface R1,7 in that order as viewed from the object side. The first optical unit B1 is a lens unit having a negative refractive power as a whole. Similarly to the third embodiment, the direction of the reference axis A0 that enters the first optical unit B1 and the direction of a reference axis A1,7 that exits from the first optical unit B1 are parallel to and the same as each other.

The second optical unit B2 includes a convex refracting surface R2, 1, a convex mirror R2,2, a concave mirror R2,3, an internal refracting surface R2,4, a convex mirror R2,5, a concave mirror R2,6 and a convex refracting surface R2,7 in that order as viewed from the object side. The second optical unit B2 is a lens unit having a positive refractive power as a whole. Similarly to the first optical unit B1, the direction of the reference axis A1,7 that enters the second optical unit B2 and the direction of a reference axis A2,7 which that from the second optical unit B2 are parallel to and the same as each other.

The zoom optical system shown in FIG. 8 also includes an optical correcting plate Bf that employs a parallel-plane plate and is composed of a quartz low-pass filter, an infrared cut filter or the like.

The zoom optical system shown in FIG. 8 also includes an image-pickup-element surface P, which is the image pickup surface of a CCD (image pickup medium) or the like, and the stop BL, which is disposed on the object side of the first optical unit B1. In FIG. 8, symbol A0 denotes the reference axis of the zoom optical system.

The image-forming action of the fifth embodiment will be described below. A light beam from an object passes through the stop BL while being restricted to a required amount of incidence by the stop BL, and is then refracted by and passes through the concave refracting surface R1,1 and the internal refracting surface R1,2 of the first optical unit B1. Then, the light beam is repeatedly reflected by the concave mirror R1,3, the concave mirror R1,4, the concave mirror R1,5 and the convex mirror R1,6 in that order while undergoing convergence or divergence due to the power of each of these reflecting mirrors. When the light beam reaches the concave refracting surface R1,7, the light beam is refracted by the concave refracting surface R1,7 and exits from the first optical unit B1. Incidentally, an intermediate image of the image is temporarily formed in the first optical unit B1. The internal refracting surface R1,2 in the first optical unit B1 has a small extent of a chromatic-aberration correcting effect, but is an internal refracting surface of the type used in the second embodiment and is used as a reference surface for integrally forming the entrance refracting surface R1,1, as by replica molding. The internal refracting surface R1,2 is normally formed as a spherical surface or a plane surface. If the entrance-refracting surface R1,1 is formed as an aspherical surface, the first optical unit B1 and the entire optical system can be corrected for aberration.

Then, the light beam passes through the convex refracting surface R2,1 of the second optical unit B2, and is reflected by the convex mirror R2,2 and the concave mirror R2,3 in that order. After having passed through the internal refracting surface R2,4, the light beam is reflected by the convex mirror R2,5 and the concave mirror R2,6 in that order. The light beam is refracted by the convex refracting surface R2,7 and exits from the second optical unit B2. Incidentally, an intermediate image is temporarily formed in the second optical unit B2 as well.

The light beam, which has exited from the second optical unit B2 passes through the optical correcting plate Bf and forms an image of the object on the image pickup element surface P.

Incidentally, the internal refracting surface R2,4 in the second optical unit B2 is a cemented surface having the function of correcting chromatic aberration mainly due to the entrance refracting surface R2,1 and the exit refracting surface R2,7 and is a cemented refracting surface of the type used in the first embodiment.

In the fifth embodiment, similarly to the third embodiment, the focal length (image forming magnification) of the entire optical system is varied by relatively moving the first and second optical units B1 and B2 with respect to the image-forming plane P without varying the final image forming position P.

Figure 9A:
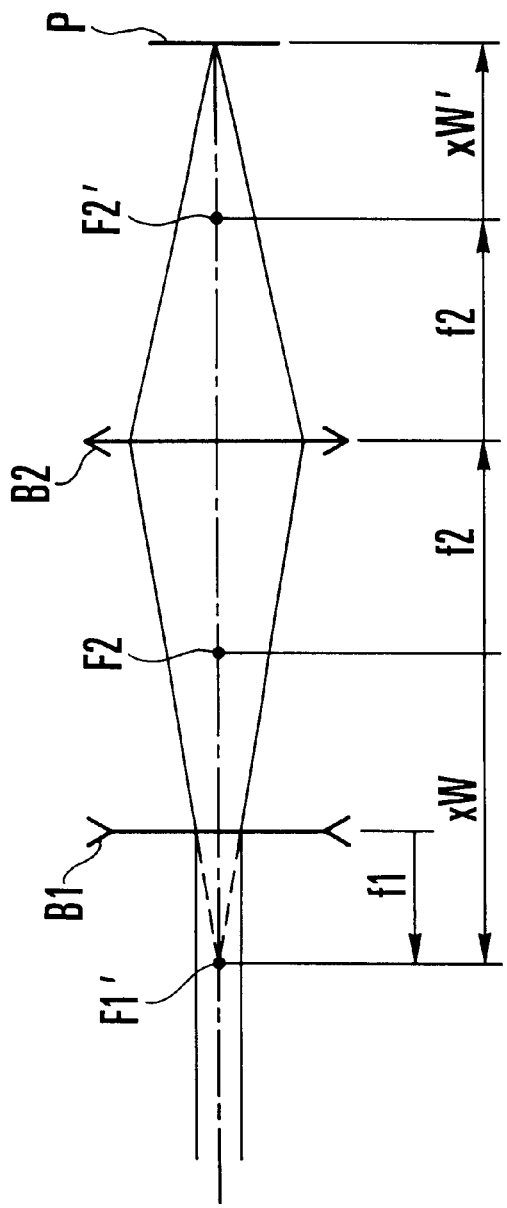
FIGS. 9(A) and 9(B) are explanatory views aiding in explaining the magnification-varying operation of the fifth embodiment.
Figure 9B:
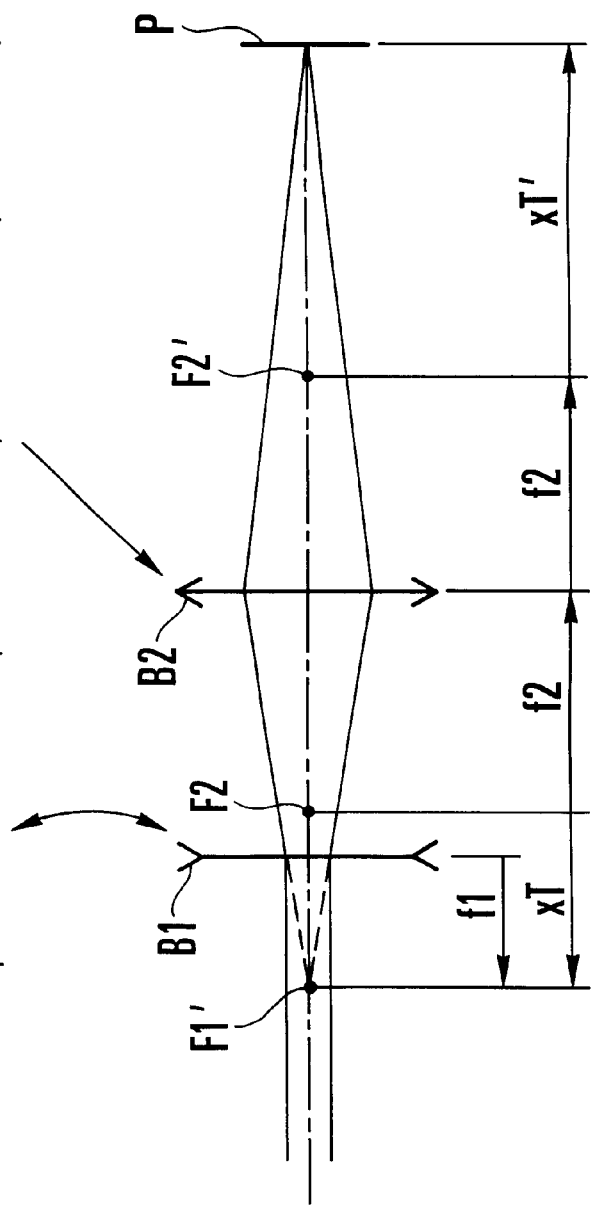

The magnification-varying operation of the fifth embodiment will be described below with reference to FIGS. 9(A) and 9(B). FIGS. 9(A) and 9(B) are optical layout views, each showing the first and second optical units B1 and B2 of the fifth embodiment in the form of single thin lenses, and show different states in which the optical system is developed with respect to the reference axis. Incidentally FIG. 9(A) is a layout view of the state in which the optical system is set to the wide-angle end (W), while FIG. 9(B) is a layout view of the state in which the optical system is set to the telephoto end (T).

In FIGS. 9(A) and 9(B), f1(−) represents the focal length of the first optical unit B1, f2 represents the focal length of the second optical unit B2, xW(−) represents the distance from a front focal point F2 of the second optical unit B2 to the image point of the first optical unit B1 with the optical system being set to the wide-angle end (W), and xW' represents the distance from a rear focal point F2' of the second optical unit B2 to the image forming plane P with the optical system being set to the wide-angle end (W) From Newton's formula for image formation, if $$xW*xW'=-f2*f2$$

is satisfied, the image forming magnification β2W of the second optical unit B2 becomes:

$$\beta 2W = -(xW' + f2)/(-xW + f2) \quad (6)$$
$$= f2/xW$$
$$= -xW'/f2,$$

and also the focal length fW of the entire optical system at the wide-angle end becomes:

$$fW = f1 * \beta 2W \quad (7)$$
$$= f1 * f2/xW.$$

Thus, if the second optical unit B2 moves while satisfying Newton's formula for image formation and the first optical unit B1 moves to correct the positional variation of the object point of the second optical unit B2 due to the movement of the second optical unit B2, the optical system can vary the entire focal length without varying the final image-forming position P.

Suppose that the second optical unit B2 has moved by a predetermined amount and the optical system has shifted from the wide-angle end (W) to the telephoto end (T). In FIG. 9(B), xT(−) represents the distance from the front focal point F2 of the second optical unit B2 to the image point of the first optical unit B1 with the optical system being set to the telephoto end (T), and xT' represents the distance from the rear focal point F2' of the second optical unit B2 to the image forming plane P with the optical system being set to the telephoto end (T). The image forming magnification β2T of the second optical unit B2 becomes:

$$\beta 2T = (xT' + f2)/(-xT + f2) \quad (8)$$
$$= f2/xT$$
$$= -xT'/f2,$$

and also the focal length fT of the entire optical system at the telephoto end becomes:

$$fT = f1 * \beta 2T \quad (9)$$
$$= f1 * f2/xT$$

Therefore, the magnification variation ratio Z of the optical system becomes:

$$Z = fT/fW \quad (10)$$
$$= xW/xT.$$

In the third embodiment, the intermediate image-forming plane P1 is present at an intermediate position between the first optical unit B1 and the second optical unit B2; whereas, in the fifth embodiment, the first optical unit B1 has a negative refractive power as a whole and forms an image of an object light beam from infinity on the object side in the form of a virtual image, and the image-forming relationship of the second optical unit B2 is established by using the position of the virtual image as the object point.

Even in the case of another optical arrangement in which both optical units are arranged in the reverse order to the fifth embodiment, i.e., an optical unit having a positive refractive power as a whole and an optical unit having a negative refractive power as a whole are arranged in that order as viewed from the object side, it is possible to vary the focal length (image-forming magnification) of the zoom optical system by relatively moving each of the optical units.

Sixth Embodiment

Figure 10:
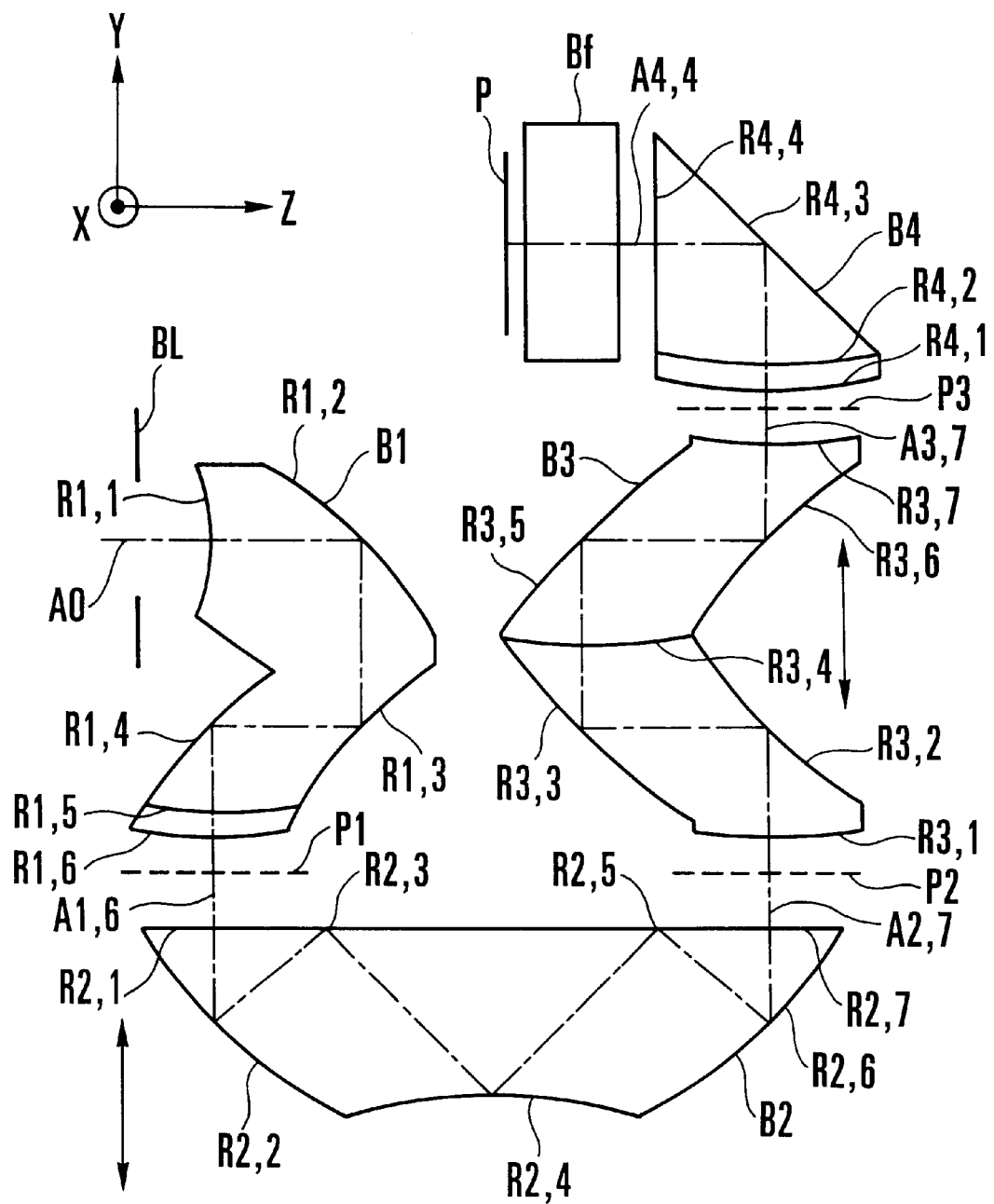
FIG. 10 is a diagrammatic view of the essential portion of a sixth embodiment of the present invention.

FIG. 10 is a schematic view of the essential portion of a zoom optical system according to the sixth embodiment of the present invention. The sixth embodiment is intended for a four-optical-unit type of zoom optical system that has four optical units as a whole and performs zooming by moving two of these optical units. The zoom optical system shown in FIG. 10 includes a first optical unit B1, a second optical unit B2 and a third optical unit B3, each of which has a plurality of curved reflecting surfaces. The first optical unit B1 includes a concave refracting surface R1,1, three reflecting surfaces, i.e., a concave mirror R1,2, a convex mirror R1,3 and a concave mirror R1,4, an internal refracting surface R1,5 and a convex refracting surface R1,6 in that order as viewed from the object side. The first optical unit B1 has a positive refractive power as a whole, and the direction of the reference axis A0 that enters the first optical unit B1 and the direction of a reference axis A1,6 that exits from the first optical unit B1 are approximately perpendicular to each other.

The second optical unit B2 includes a plane entrance surface R2, 1, five reflecting surfaces, i.e., a concave mirror R2,2, a plane mirror R2,3, a convex mirror R2,4, a plane mirror R2,5 and a concave mirror R2,6, and an exit plane surface R2,7, in that order as viewed from the object side. The second optical unit B2 has a positive refractive power as a whole, and the direction of the reference axis A1,6 that enters the second optical unit B2 and the direction of a reference axis A2,7 that exits from the second optical unit B2 are parallel to and opposite to each other.

The third optical unit B3 includes a convex refracting surface R3,1, a convex mirror R3,2, a concave mirror R3,3, an internal refracting surface R3,4, a concave mirror R3,5, a convex mirror R3,6, and a concave refracting surface R3,7 in that order as viewed from the object side. The third optical unit B3 has a positive refractive power as a whole, and the direction of the reference axis A2,7 that enters the third optical unit B3 and the direction of a reference axis A3,7 that exits from the third optical unit B3 are parallel to and the same as each other.

A fourth optical unit B4 is a triangular prism that includes a convex refracting surface R4,1, an internal refracting surface R4,2, a plane mirror R4,3 and a plane surface R4,4 in that order as viewed from the object side, and the direction of the reference axis A3,7 that enters the fourth optical unit B4 and the direction of a reference axis A4,4 that exits from the fourth optical unit B4 are approximately perpendicular to each other.

The zoom optical system shown in FIG. 10 also includes an optical correcting plate Bf that employs a parallel-plane plate and is composed of a low-pass filter made of a quartz material, an infrared cut filter or the like.

The zoom optical system shown in FIG. 10 also includes the image-pickup element surface P, such as the image pickup surface of a CCD (image pickup medium), and the stop BL, which is disposed on the object side of the first optical unit B1. In FIG. 7, symbol A0, A1,6, A2,7, A3,7, A4,4 and so on represent the reference axes of the present zoom optical system.

The image forming action of the sixth embodiment will be described below. A light beam from an object is passed through the stop BL while being restricted to a required amount of incidence by the stop BL, and enters the first optical unit B1. The first optical unit B1 forms the intermediate image-forming plane P1 between its exit surface R1,6 and the entrance surface R2,1 of the second optical unit B2.

The object image formed on the intermediate image-forming plane P1 is again formed on an intermediate image-forming plane P2 between the exit surface R2,7 of the second optical unit B2 and the entrance surface R3,1 of the third optical unit B3 by the second optical unit B2.

The object image formed on the intermediate image-forming plane P2 is again formed on an intermediate image-forming plane P3 between the exit surface R3,7 of the third optical unit B3 and the entrance surface R4,1 of the fourth optical unit B4 by the third optical unit B3.

The fourth optical unit B4 converges the light beam from the object image formed on the intermediate image-forming plane P3 and forms the object image on the image-pickup-element surface P via the optical correcting plate Bf.

In the sixth embodiment, to reduce the length of the optical system, particularly, in the Z direction of FIG. 10, the optical units are disposed so that the optical path of the entire optical system can be effectively folded to remarkably reduce the length in the Z direction.

Specifically, the light beam that has entered the first optical unit B1 is made incident on the concave refracting surface R1,1, and is then reflected in a direction perpendicular to the entering direction, i.e., in the Y(−) direction, by the concave mirror R1,2 disposed behind the concave refracting surface R1,1.

The object light beam is then reflected in the Z(−) direction by the convex mirror R1,3 so that the length of the entire optical system is reduced in the Z-axis direction.

The object light beam, which has been reflected in the Z(−) direction, is again reflected in the Y(−) direction by the concave mirror R1,4, and then passes through the internal refracting surface R1,5 and the convex refracting surface R1,6 and enters the second optical unit B2.

In the second optical unit B2, the object light beam is totally reflected at the plane surface R2,3 and the plane surface R2,5, an effective ray area on the entrance surface R2,1 of the second optical unit B2 and that on the plane surface R2,3 of the second optical unit B2 overlap each other, and an effective ray area on the exit surface R2,7 of the second optical unit B2 and that on the plane surface R2,5 of the second optical unit B2 overlap each other. Thus, the length of the second optical unit B2 is reduced in the Z-axis direction.

Then, the object light beam that has entered the second optical unit B2 in the Y(−) direction exits in the Y(+) direction and enters the third optical unit B3.

In the third optical unit B3, the object light beam is reflected in the Z(−) direction by the convex mirror R3,2, and after the object light beam is reflected in the Y(+) direction by the concave mirror R3,3 at a position which does not interfere with the first optical unit B1, the object light beam passes through the internal refracting surface R3,4 and is temporarily reflected in the Z(+) direction by the concave mirror R3,5. Then, the object light beam is reflected in the Y(+) direction at a Z-axis position approximately identical to the point of incidence of the object light beam on the convex mirror R3,2, and the thus-reflected object light beam passes through the concave refracting surface R3,7 and enters the fourth optical unit B4.

In the fourth optical unit B4, after the object light beam is reflected in the Z(−) direction by the plane mirror R4,3, the object light beam passes through the optical correcting plate Bf and forms the object image on the image-pickup-element surface P.

The internal refracting surface R3,4 present in the third optical unit B3 is a cemented surface having the effect of correcting chromatic aberration mainly due to the entrance refracting surface R3,1 and the exit refracting surface R3,7, and is an internal refracting surface of the type used in the first embodiment. The internal refracting surface R1,5 in the first optical unit B1 and the internal refracting surface R4,2 in the fourth optical unit B4 are respectively mainly used as reference surfaces for integrally forming the adjacent exit refracting surface R1,6 and the adjacent entrance refracting surface R4,1, as by replica molding. Each of the internal refracting surfaces R1,5 and R4,2 is an internal refracting surface of the type used in the second embodiment. Since each of the internal refracting surfaces that are used as such reference surfaces are normally formed as spherical surfaces or plane surfaces, such internal refracting surfaces can be used as references for measurement of the accuracy of such aspherical reflecting optical units. Accordingly, the internal refracting surfaces are useful for producing the optical units with high accuracy. In addition, if the exit refracting surface R1,6 and the entrance refracting surface R4,1 are formed as aspherical surfaces, the first optical unit B1, the fourth optical unit B4 and the entire optical system can be corrected for aberration.

The first, second, third and fourth optical units B1, B2, B3 and B4 of the sixth embodiment constitute part of a four-optical-unit type of zoom optical system. The focal length (image-forming magnification) of the zoom optical system is varied by relatively moving the second optical unit B2 and the third optical unit B3.

The magnification-varying operation of the sixth embodiment will be described below. During a variation of magnification, the first optical unit B1, the fourth optical unit B4, the optical correcting plate Bf and the image-pickup-element surface P are fixed, while the second optical unit B2 and the third optical unit B3 are moved.

During a variation of magnification from the wide-angle end to the telephoto end, the second optical unit B2 moves in the Y(−) direction away from the first optical unit B1.

Accordingly, the distance between the optical units B1 and B2 increases, but, unlike the case of the third embodiment in which the direction of the entering reference axis and the direction of the exiting reference axis are the same as each other, the distance between the optical units B2 and B3 also increases by the same amount as the distance between the optical units B1 and B2, because the direction of the reference axis that enters the second optical unit B2 and the direction of the reference axis that exits from the second optical unit B2 are parallel to and opposite to each other.

Specifically, letting δ be the amount of movement of the second optical unit B2, even if the first optical unit B1 and the image-forming plane P are fixed during a variation of magnification, the entire length of the zoom optical system becomes larger by twice the amount of movement δ of the second optical unit B2.

FIGS. 11(A) and 11(B) are optical layout views each showing the optical units of the sixth embodiment in the form of single thin lenses, and show different states in which the zoom optical system is developed with respect to the reference axis. The magnification-varying operation of the sixth embodiment will be described below with reference to FIGS. 11(A) and 11(B). Incidentally, FIG. 11(A) is a layout view of the state in which the optical system is set to the wide-angle end (W), while FIG. 11(B) is a layout view of the state in which the optical system is set to the telephoto end (T).

In FIGS. 11(A) and 11(B), f1 represents the focal length of the first optical unit B1, f2 represents the focal length of the second optical unit B2, f3 represents the focal length of the third optical unit B3, and f4 represents the focal length of the fourth optical unit B4.

Assuming that the optical system is set to the wide-angle end (W), x2W(−) represents the distance from the front focal point F2 of the second optical unit B2 to the primary image forming plane N1, x2W' represents the distance from the rear focal point F2' of the second optical unit B2 to the secondary image forming plane N2, x3W(−) represents the distance from a front focal point F3 of the third optical unit B3 to the secondary image forming plane N2, x3W' represents the distance from a rear focal point F3' of the third optical unit B3 to a ternary image forming plane N3, x4(−) represents the distance from a front focal point F4 of the fourth optical unit B4 to the ternary image forming plane N3, and x4' represents the distance from a rear focal point F4' of the fourth optical unit B4 to the image forming plane P.

Let β2W be the image-forming magnification of the second optical unit B2, let β3w be the image-forming magnification of the third optical unit B3, and let β4 be the image-forming magnification of the fourth optical unit B4. (The respective symbols W and T indicate that the optical system is set to the wide-angle end and that the optical system is set to the telephoto end.)

If Newton's formula for image formation is satisfied with respect to each intermediate formed image and each image forming plane, a composite magnification βw determined by the optical units disposed behind the first optical unit B1 becomes:

$$\beta W = \beta 2W * \beta 3W * \beta 4 \qquad (11)$$

$$= (f2/x2W)*(f3/x3W)*(f4/x4)$$

$$= (f2*f3*f4)/(x2W*x3W*x4),$$

and the focal length fW of the entire optical system at the wide-angle end is expressed as:

$$fW = f1 * \beta W \qquad (12)$$

$$= (f1*f2*f3*f4)/(x2W*x3W*x4)$$

Thus, if the third optical unit B3 is moved by η to prevent a positional variation of the ternary image-forming plane N3 by correcting the position of the ternary image forming plane N3 according to a positional variation of the secondary image-forming plane N2 which occurs when the second optical unit B2 moves by δ with respect to the first optical unit B1, the optical system can vary the focal length without varying the position of the final image-forming P.

Referring to FIG. 11(B), which is a developed view of the optical layout for the telephoto end, since the image forming plane P is fixed, the first optical unit B1 which is originally fixed is shown to be relatively moved by 26.

Since the second optical unit B2 is moved by 6 with respect to the first optical unit B1, a distance x2T(−) from the front focal point F2 of the second optical unit B2 to the primary image forming plane N1 becomes:

$$x2T = x2W - \delta. \quad (13)$$

In addition, since the third optical unit B3 is moved by η with respect to the ternary image forming plane N3, a distance x3T' from the front focal point F3' of the third optical unit B3 to the ternary image forming plane N3 becomes:

$$x3T' = x3W' - \eta \quad (14)$$
$$= -(f3^2/x3W + \eta).$$

Furthermore, since the entire length of the zoom optical system becomes longer by 2δ, a distance x2T–x3T from the rear focal point F2' of the second optical unit B2 to the front focal point F3 of the third optical unit B3 becomes:

$$x2T' - x3T = x2W' - x3W + \delta + \eta \quad (15)$$
$$= -f2^2/x2W - x3W + \delta + \eta.$$

By using Expressions (13) and (14), X2T' and X3T of Expression (15) are expressed as:

$$x2T' = -f2^2/x2T \quad (16)$$
$$= -f2^2 * x2/W - \delta)$$

$$x3T = -f3^2/x3T' \quad (17)$$
$$= (f3^2 * x3W)/(f3^3 + x3W * \eta).$$

Therefore, Expression (15) becomes:

$$-f2^2/(x2W - \delta) - (f3^2 * x3W)/(f3^2 + x3W * \eta) = \quad (18)$$
$$-f2^2/x2W - x3W + \delta + \eta.$$

Accordingly, the relationship of the movement of the third optical unit B3 with respect to the movement of the second optical unit B2 can be expressed from Expression (18).

In addition, since a composite magnification βT of the optical units disposed on the image side of the first optical unit B1 is expressed:

$$\beta T = \beta 2T * \beta 3T * \beta 4 \quad (19)$$
$$= (f2/x2T) * (f3/x3T) * (f4/x4)$$
$$= (f2 * f3 * f4)/(x2T * x3T * x4),$$

the focal length fT of the entire optical system at the telephoto end after the movement of the optical units in the sixth embodiment becomes:

$$fT = f1 * \beta T = (f1 * f2 * f3 * f4)/(x2T * x3T3x4) \quad (20)$$
$$= f1 * f2 * f3 * f4 * (f3^2 + x3W * \eta)/$$
$$\{(x2W - \delta) * f3^2 * x3W * x4\}.$$

Accordingly, the magnification-variation ratio Z of the zoom optical system becomes:

$$Z = fT/fW \quad (21)$$

-continued
$$= x2W * x3W/(x2T * x3T)$$
$$= x2W * x3W * (f3^2 + x3W * \eta)/\{(x2W - \delta) * f3^2 * x3W\}$$
$$= x2W * (f3^2 + x3W * \eta)/\{(x2W - \delta) * f3^2\}.$$

In the sixth embodiment, the length of the optical system in the Z direction is remarkably reduced by adopting the arrangement in which the optical path is effectively folded by using the optical units in the above-described manner. In addition, since the shape of the third optical unit B3 is selected to fill a dead space that follows the first optical unit B1, the layout of all the optical units involves no unnecessary space.

Furthermore, by adopting the arrangement in which the second optical unit B2 and the third optical unit B3 are moved in the Y-axis direction during variation of magnification, the length in the Z-axis direction is kept unchanged over the entire range of variation of magnification.

Although in the sixth embodiment the direction of the reference axis A4,4 that exits from the fourth optical unit B4 is bent by an angle of 90° with respect to the direction of the reference axis A3,7 that enters the fourth optical unit B4, the direction and the angle of the exiting reference axis A4,4 are not limited to those of the sixth embodiment. For example, a reflecting surface may be added so that the exiting reference axis A4,4 is bent in a direction perpendicular to the surface of the sheet of FIG. FIG. 10 (the X direction).

In addition, the reference axis A0 may be made to enter the optical system in a different direction in such a way that the reference axis A0 enters in a direction perpendicular to the surface of the sheet, as by disposing a 45° mirror or the like on the object side of the stop BL.

In addition, in the sixth embodiment, since the first optical unit B1 is fixed during a variation of magnification, the first optical unit B1 and its reflecting surfaces for bending the entering reference axis may be integrally formed in advance.

In the sixth embodiment, focusing may also be performed by moving the first optical unit B1 other than at least the two second optical units B2 and B3 that vary the aforesaid relative position.

Seventh Embodiment

Figure 12:
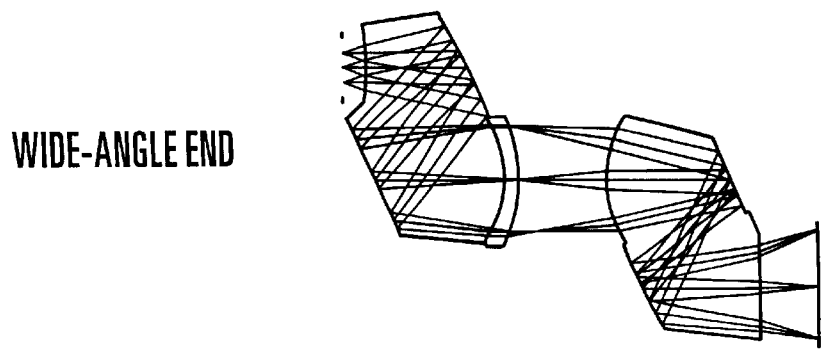
FIGS. 12(A), 12(B) and 12(C) are views showing an optical cross section taken on a Y, Z plane, of a seventh embodiment of the present invention.
Figure 12:
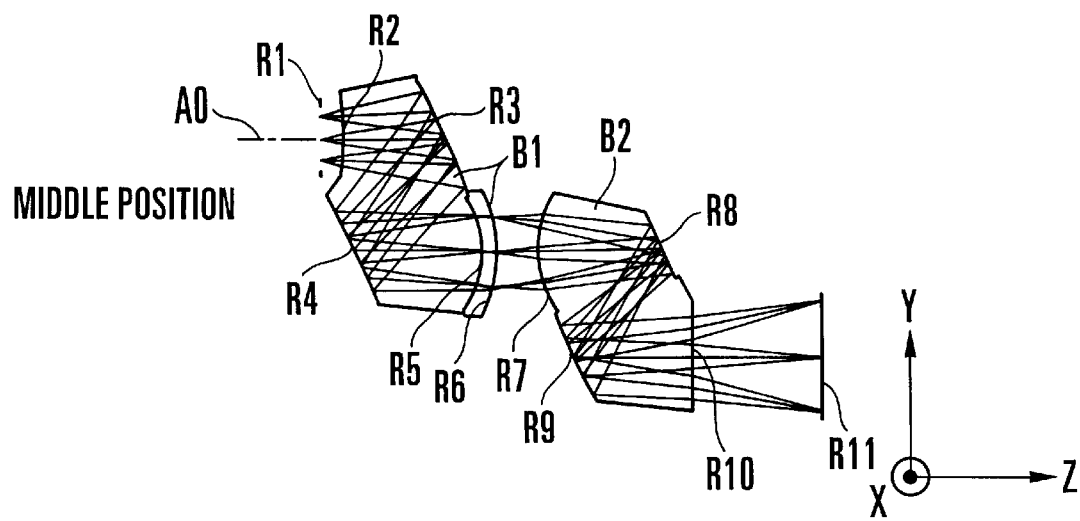
Figure 12:
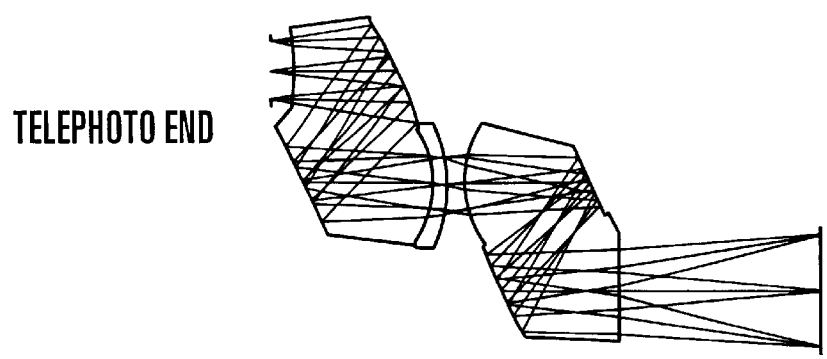

FIGS. 12(A), 12(B) and 12(C) are optical cross-sectional views, taken on the Y, Z plane, of a zoom optical system according to a seventh embodiment of the present invention. The seventh embodiment is intended for a two-optical-unit type of zoom optical system similar to the third embodiment.

In the seventh embodiment, reflecting surfaces that constitute part of a mirror optical system are so-called anamorphic surfaces whose curvatures parallel to the surface of the sheet of each of FIGS. 12(A) to 12(C) are different from curvatures perpendicular to the surface of the sheet of the same, and the reflecting surfaces are arranged to correct decentering aberrations that occur due to the reflecting mirrors decentered for the purpose of preventing a light beam from being blocked in the mirror optical system.

In addition, by arranging these reflecting surfaces as rotationally asymmetrical surfaces, it is possible to fully correct various aberrations and achieve optical units having desired optical performance.

The seventh embodiment is a photographing optical system which serves as a zoom lens having a variable magnification ratio of approximately 2×. Constituent data for the seventh embodiment are shown

|  | WIDE-ANGLE END | MIDDLE POSITION | TELEPHOTO END |
|---|---|---|---|
| HORIZONTAL HALF-ANGLE OF VIEW | 19.1 | 13.0 | 9.8 |
| VERTICAL HALF-ANGLE OF VIEW | 14.5 | 9.8 | 7.4 |
| APERTURE DIAMETER | 2.00 | 3.00 | 4.00 |
| IMAGE SIZE | HORIZONTAL 4 mm × VERTICAL 3 mm | | |
| SIZE OF OPTICAL SYSTEM (X × Y × Z) = | 6.6 × 21.4 × 32.9 AT WIDE-ANGLE END | | |

| i | $Y_i$ | $Z_i(W)$ | $\theta_i$ | $D_i$ | $N_{di}$ | $\nu_{di}$ |  |
|---|---|---|---|---|---|---|---|
| 1 | 0.00 | 0.00 | 0.00 | 1.54 | 1 | | STOP |
| FIRST OPTICAL UNIT B1 | | | | | | | |
| 2 | 0.00 | 1.54 | 0.00 | 7.00 | 1.62000 | 60.30 | REFRACTING SURFACE |
| 3 | 0.00 | 8.54 | 25.00 | 10.00 | 1.62000 | 60.30 | REFLECTING SURFACE |
| 4 | −7.66 | 2.11 | 25.00 | 9.00 | 1.62000 | 60.30 | REFLECTING SURFACE |
| 5 | −7.66 | 11.11 | 0.00 | 1.00 | 1.49171 | 57.40 | REFRACTING SURFACE |
| 6 | −7.66 | 12.11 | 0.00 | VARIABLE | 1 | | REFRACTING SURFACE |
| SECOND OPTICAL UNIT B2 | | | | | | | |
| 7 | −7.66 | 17.83 | 0.00 | 8.50 | 1.72315 | 46.43 | REFRACTING SURFACE |
| 8 | −7.66 | 26.33 | 25.00 | 9.50 | 1.72315 | 46.43 | REFLECTING SURFACE |
| 9 | −14.94 | 20.22 | 25.00 | 8.00 | 1.72315 | 46.43 | REFLECTING SURFACE |
| 10 | −14.94 | 28.22 | 0.00 | VARIABLE | 1 | | REFRACTING SURFACE |
| 11 | −14.94 | 32.22 | 0.00 | | 1 | | IMAGE PLANE |

|  | WIDE-ANGLE END | MIDDLE POSITION | TELEPHOTO END |
|---|---|---|---|
| D6 | 5.72 | 2.57 | 1.00 |
| D10 | 4.00 | 8.90 | 13.77 |

| R1–R6 | $Z_i(M) = Z_i(W) - 1.74$ | $Z_i(T) = Z_i(W) - 5.05$ |
|---|---|---|
| R7–R10 | $Z_i(M) = Z_i(W) - 4.90$ | $Z_i(T) = Z_i(W) - 9.77$ |
| R11 | $Z_i(M) = Z_i(W)$ | $Z_i(T) = Z_i(W)$ |

SPHERICAL SHAPE

| R2 | $r2 =$ | −18.881 |
|---|---|---|
| R5 | $r5 =$ | −6.713 |
| R7 | $r7 =$ | 7.566 |
| R10 | $r10 =$ | 1527.382 |

ASPHERICAL SHAPE

| R3 | C02 = | −1.57004e−02 | C20 = | −1.86992e−02 | | |
| --- | --- | --- | --- | --- | --- | --- |
| | C03 = | −9.58635e−05 | C21 = | −1.05998e−04 | | |
| | C04 = | −6.65716e−06 | C22 = | −2.168093e−05 | C40 = | −1.95301e−05 |
| R4 | C02 = | −2.25429e−04 | C20 = | −7.91780e−04 | | |
| | C03 = | 3.63799e−04 | C21 = | 5.09287e−04 | | |
| | C04 = | −8.60109e−05 | C22 = | −2.35102e−04 | C40 = | −1.82314e−04 |
| R6 | a = | −7.96324e+00 | b = | −7.96324e+00 | t = | 0.00000e+00 |
| | C03 = | 0.00000e+00 | C21 = | 0.00000e+00 | | |
| | C04 = | 6.61581e−04 | C22 = | 1.32316e−03 | C40 = | 6.61581e−04 |
| | C05 = | 0.00000e+00 | C23 = | 0.00000e+00 | C41 = | 0.00000e+00 |
| | C06 = | −1.52759e−06 | C24 = | −4.58278e−06 | C42 = | −4.58278e−06 |
| | C60 = | −1.52759e−06 | | | | |
| R8 | C02 = | −5.94491e−03 | C20 = | −7.57898e−03 | | |
| | C03 = | −1.39800e−04 | C21 = | −6.75841e−05 | | |
| | C04 = | 2.45500e−04 | C22 = | 5.79842e−04 | C40 = | 3.25414e−04 |
| R9 | C02 = | 1.60992e−02 | C20 = | 2.04548e−02 | | |
| | C03 = | 6.02911e−04 | C21 = | 7.72049e−04 | | |
| | C04 = | 3.77755e−05 | C22 = | 5.49055e−05 | C40 = | 2.23088e−05 |

In the seventh embodiment, a first surface R1 is an aperture plane, which is an entrance pupil, and second to sixth surfaces R2 to R6 and seventh to tenth surfaces R7 to R10 integrally constitute a first optical unit B1 and a second optical unit B2, respectively. An eleventh surface R11 is an image plane.

An image-forming operation for an object lying at infinity will be described below. First, a light beam that has passed through the first surface R1 is made incident on the first optical unit B1. In the first optical unit B1, the light beam is refracted by the second surface R2, then reflected by the third surface R3 and the fourth surface R4, then refracted by the fifth surface R5 and the sixth surface R6, and then exits from the first optical unit B1. During this time, a primary image is formed on an intermediate image forming plane in the vicinity of the sixth surface R6.

Then, the light beam enters the second optical unit B2. In the second optical unit B2, the light beam is refracted by the seventh surface R7, then reflected by the eighth surface R8 and the ninth surface R9, then refracted by the tenth surface R10, and then exits from the second optical unit B2. During this time, a pupil is formed between the eighth surface R8 and the ninth surface R9 in the second optical unit B2. Then, the light beam which has exited from the second optical unit B2 finally forms an image on the eleventh surface R11 (the image-pickup surface of an image-pickup medium such as a CCD).

Incidentally, the refracting surface R5 provided in the interior of the first optical unit B1 serves to correct chromatic aberration due to the entrance and exit refracting surfaces R2 and R6. In addition, the exit refracting surface R6, which is provided in the vicinity of the internal refracting surface R6, can be realized by cementing the surface R6 to a block of uniform refractive index consisting of the refracting surfaces R2 to R5, as by a replica molding technique, so that the seventh embodiment can provide an arrangement that is suited to mass production as compared with a normal cementing method. Incidentally, in the seventh embodiment, the surface R6 is formed as an aspherical surface because aspherical surfaces can be designed to have far higher optical performance than spherical surfaces. In addition, since the surface R6 is an aspherical surface, if the cemented surface R5 is formed as a spherical surface or a plane surface (in the seventh embodiment, a spherical surface), the surface R5 can be used as a reference for measurement of the accuracy of other aspherical refracting and reflecting surfaces, unlike an arrangement in which the surfaces R2 to R6 are formed as one unit of uniform refractive index. Accordingly, the arrangement of the seventh embodiment is suitable for forming the optical unit with high accuracy.

Although in the seventh embodiment the entrance refracting surface R6 is provided in the vicinity of the internal refracting surface R5, such an internal refracting surface may be disposed in the vicinity of the entrance refracting surface, particularly if the entrance refracting surface is an aspherical surface. If both of the entrance and exit surfaces are aspherical surfaces, a plurality of internal refracting surfaces may be provided in such a manner that one of the internal refracting surfaces is disposed in the vicinity of the entrance surface and another is disposed in the vicinity of the exit surface.

In the seventh embodiment, the direction of the reference axis A0 that enters the first optical unit B1 is parallel to and the same as the direction of the reference axis that exits from the first optical unit B11. The direction of the reference axis that enters the second optical unit B2 is parallel to and the same as the direction of the reference axis that exits from the second optical unit B2.

Then, a magnification-varying operation effected by the movements of the respective optical units will be described below. During the magnification-varying operation, as the focal length varies from the wide-angle end toward the telephoto end, the first optical unit B1 moves in the Z minus direction, while the second optical unit B2 also moves in the Z minus direction. The eleventh surface Ri 1, which is the image plane, does not move during the magnification-varying operation. Thus, as the focal length varies from the wide-angle end toward the telephoto end, the distance between the first optical unit B1 and the second optical unit B2 is decreased, and the distance between the second optical unit B2 and the image plane R11 is increased.

Figure 13:
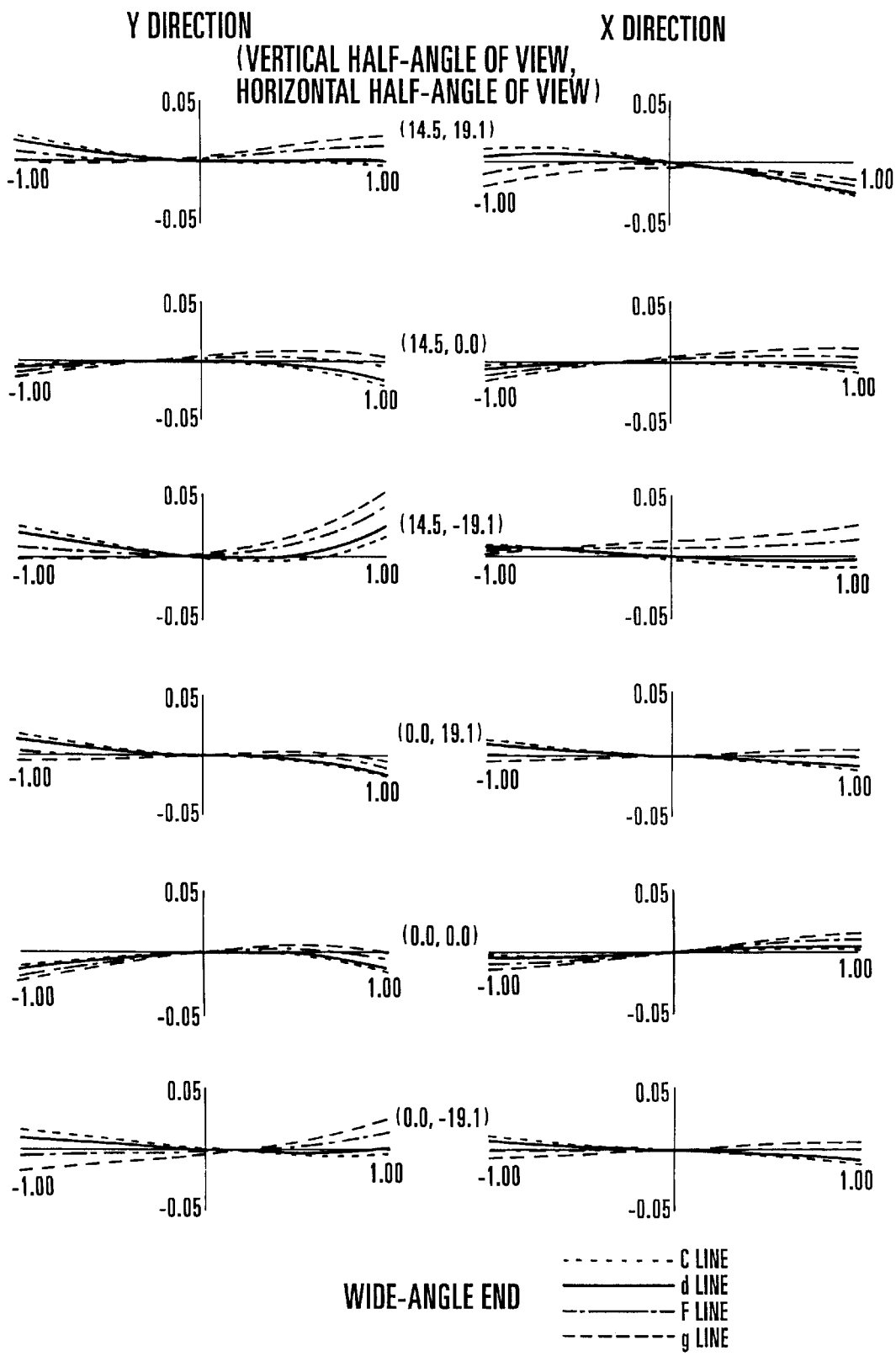
FIG. 13 shows lateral aberration charts of the seventh embodiment (wide-angle end)
Figure 14:
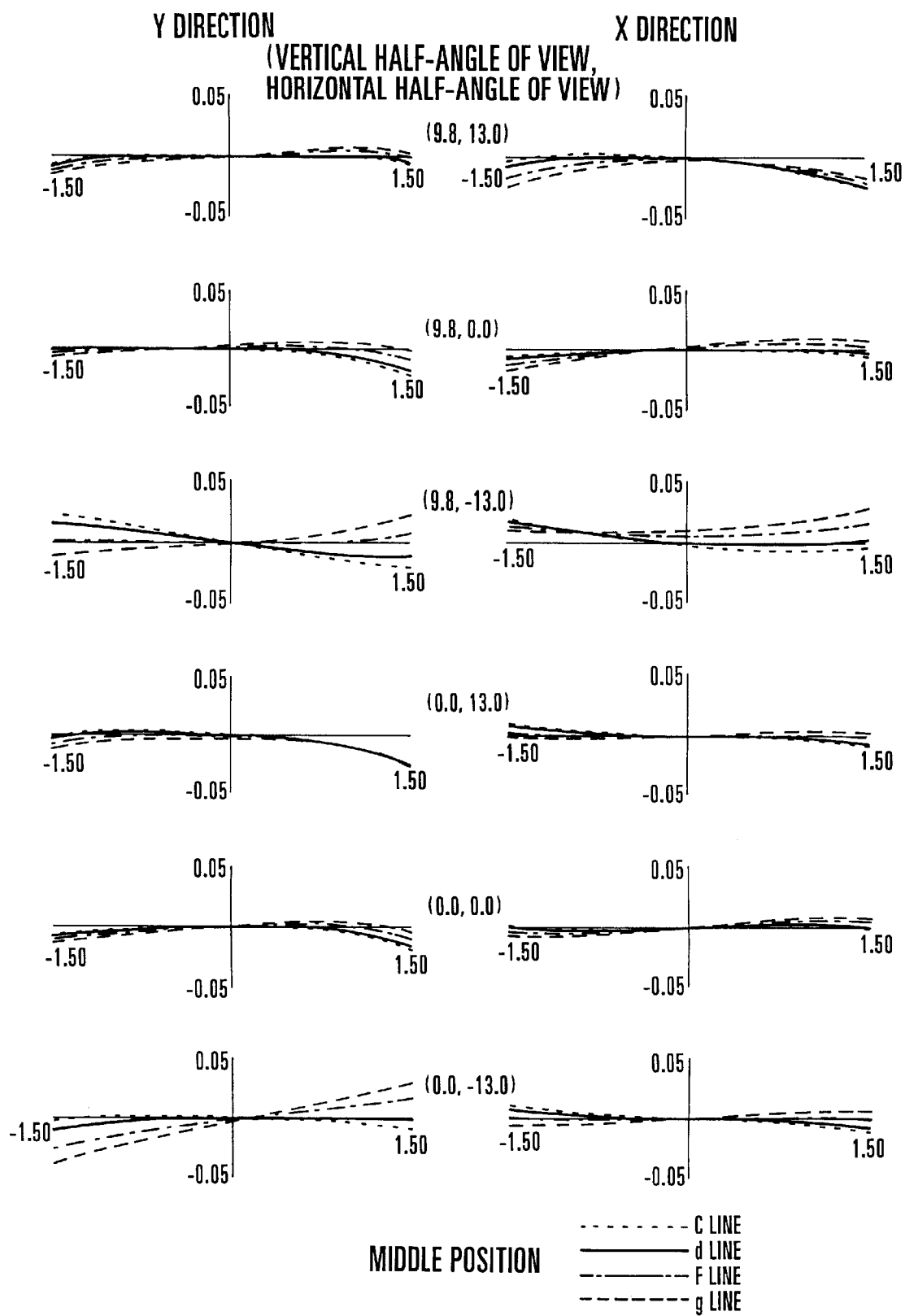
FIG. 14 shows lateral aberration charts of the seventh embodiment (middle position)
Figure 15:
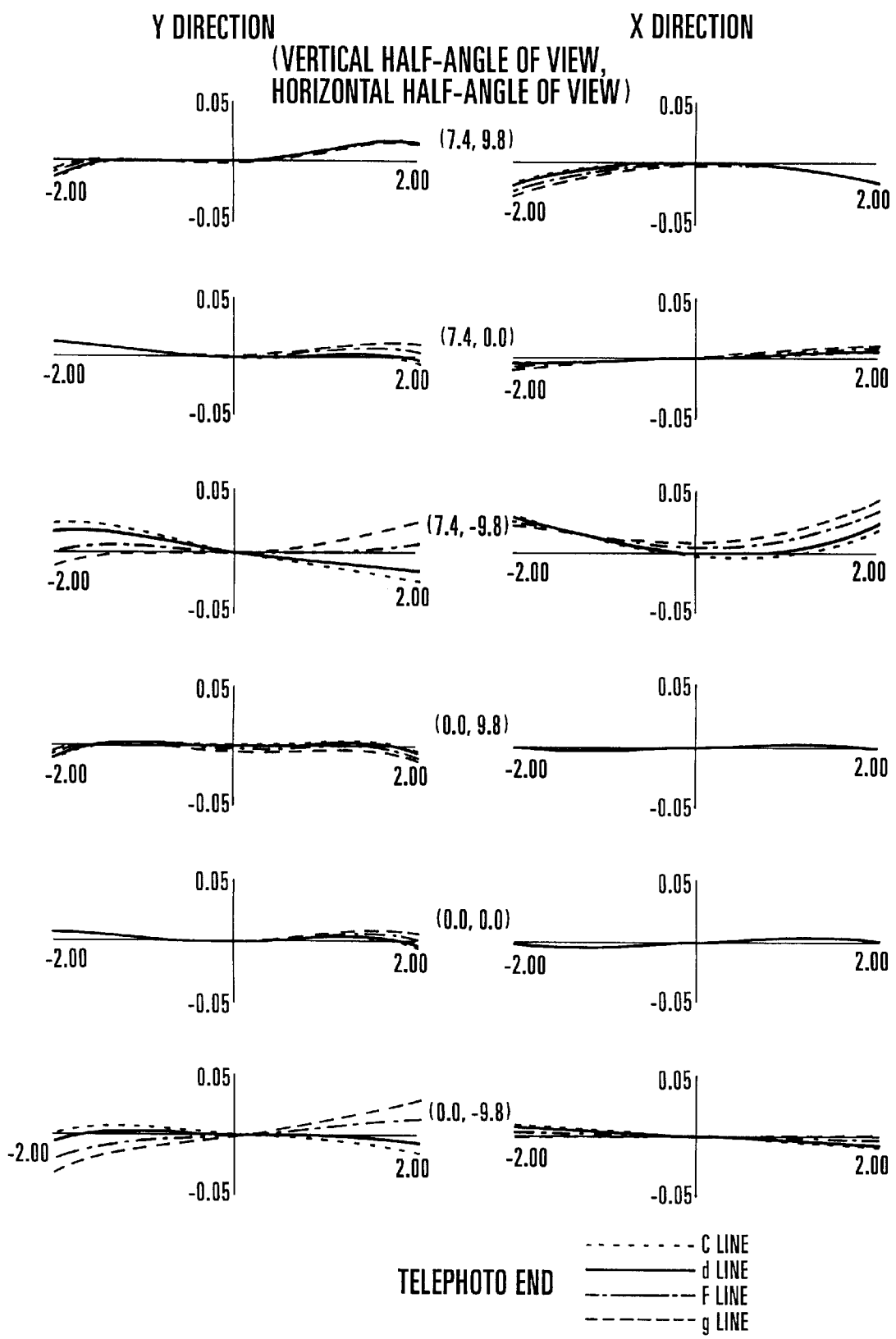
FIG. 15 shows lateral aberration charts of the seventh embodiment (telephoto end)

Each of FIGS. 13, 14 and 15 shows lateral aberration charts of the seventh embodiment. The respective lateral aberration charts show lateral aberrations in the Y and X directions, relative to six light beams that enter the seventh embodiment at different angles of incidence of (uY, uX), (0, uX), (−uY, uX), (uY, 0), (0, 0) and (−uY, 0), respectively. The horizontal axis of each of the lateral aberration charts represents the height of incidence in the Y or X direction of a light beam that is incident on the first surface.

FIG. 13 is a lateral aberration chart of the seventh embodiment for the wide-angle end (W), FIG. 14 is a lateral aberration chart of the same for the middle position (M), and FIG. 15 is a lateral aberration chart of the same for the telephoto end (T). In each of the lateral aberration charts, a dotted line corresponds to a C line, a solid line corresponds to a d line, a one-dot chained line corresponds to an F line, and a dashed line corresponds to a g line. As can be seen from FIGS. 13 to 15, the seventh embodiment is capable of achieving well-balanced correction of aberrations including chromatic aberration.

In addition, the optical system of the seventh embodiment are compact because its length, width and thickness are selected to be approximately 32.9 mm×21.4 mm×6.6 mm for an image size of 4 mm×3 mm. Particularly because each of the optical units and the entire optical system has a small thickness and each of the optical units can be produced by forming reflecting surfaces on side faces of a plate-shaped block, it is possible to readily construct a variable magnification optical system that is thin as a whole, by adopting a mechanism that causes two optical units to move along a surface of one base plate.

As is apparent from the foregoing description, in accordance with the present invention, three or more refracting surfaces and a plurality of reflecting surfaces having curvatures are formed on surfaces of or in the interior of a transparent body so that a light beam enters the transparent body from a refracting surface formed on one surface and is repeatedly reflected from surface to surface by the plurality of reflecting surfaces via an internal refracting surface and exits from the transparent body through a refracting surface formed on another surface. Accordingly, the present invention has the advantage of realizing an optical unit arranged to decrease the amount of chromatic aberration that cannot be completely eliminated only by the entrance refracting surface or the exit refracting surface. Furthermore, since at least one of the refracting surfaces in the interior of the transparent body is provided as a surface positioned immediately behind the entrance refracting surface or immediately before the exit refracting surface, it is possible to produce an optical unit by cementing the entrance refracting surface or the exit refracting surface to a block of uniform refractive index, as by a replica molding technique, whereby it is possible to realize an optical unit having an arrangement which is suited to mass production. If the entrance refracting surface or the exit refracting surface to be cemented is formed as an aspherical surface, it is possible to further improve the optical performance of the optical unit over an optical unit designed to have a spherical surface. In addition, particularly if the entrance refracting surface or the exit refracting surface is an aspherical surface, a cemented surface, if it is formed as a spherical surface or a plane surface, can be used as a reference for measurement of the accuracy of other aspherical refracting and reflecting surfaces. Accordingly, the present invention also has the advantage that it is possible to provide an optical unit having an arrangement suited to construct the optical unit with high accuracy.

In accordance with the present invention, by setting the individual constituent elements in the above-described manner, particularly by employing a plurality of optical units in each of which a plurality of curved reflecting surfaces and plane reflecting surfaces are integrally formed, so as to effect zooming by appropriately varying the relative position between at least two of the optical units, it is possible to achieve a reflecting type of zoom optical system including a small-sized mirror optical system the reflecting mirrors of which can be arranged with a reduced arrangement accuracy (assembly accuracy), compared to conventional mirror optical systems. In addition, it is possible to achieve an image-pickup apparatus employing such a reflecting type of zoom optical system.

It is also possible to achieve a reflecting type of zoom optical system that has a wide angle of view in spite of its reduced effective diameter owing to an arrangement in which a stop is disposed at a location closest to the object side of the optical system and an object image is formed in the optical system at least once, and also that has an entire length that is reduced in a predetermined direction by bending an optical path in the optical system into a desired shape by using optical units each having a plurality of reflecting surfaces of appropriate refractive powers and decentering the reflecting surfaces that constitute each of the optical units. In addition, it is possible to achieve an image pickup apparatus using such reflecting type of zoom optical system.

Further, in accordance with the present invention, it is possible to achieve a reflecting type of zoom optical system that has at least one of the following advantages, and an image-pickup apparatus using such reflecting type of zoom optical system.

In an optical system that includes a plurality of optical units in each of which a plurality of reflecting surfaces having predetermined curvatures are integrally formed, reflecting surfaces that move during variation of magnification are formed into a unit. Accordingly, as compared with the magnification-varying operation of a conventional mirror optical system, it is possible to ensure the relative position accuracy of each of the reflecting surfaces that requires a highest accuracy, by adopting an arrangement in which the relative position between the plurality of optical units is varied to effect variation of the magnification (zooming) of the optical system and focusing thereof. Accordingly, it is possible to prevent degradation of optical performance due to variation of magnification.

Since the optical units on each of which the reflecting surfaces are integrally formed are employed, the optical units themselves play the role of a lens barrel so that a mount member that is remarkably simple compared to conventional lens barrels can be used.

Since each of the optical units is formed as a lens unit on which a plurality of surfaces having curvatures are integrally formed, the number of components of the entire photographing system can be reduced compared to a refracting lens system. Accordingly, the cost of the photographing system can be reduced because of the reduced number of components.

In addition, since the number of components of the entire photographing system can be reduced, accumulated errors due to the mounting of other components can be reduced so that it is possible to prevent degradation of optical performance.

Since the reflecting surfaces of each of the optical units are disposed at appropriate positions in a decentered state, the optical path in the optical system can be bent into a desired shape so that the entire length of the optical system can be reduced.

By providing an optical unit that is fixed during a variation of magnification, some reference axes can be inclined at an arbitrary angle with respect to a plane that contains almost all the reference axes so that the freedom of design of the forms of cameras can be expanded.

By adopting an arrangement for transmitting an object image by repeating image formation a plurality of times, the effective ray diameter of each surface can be reduced so that the entire photographing optical system can be made compact.

Since the image-formation size of an intermediate image-forming plane is set to be comparatively small with respect to the size of an image-pickup surface, it is possible to reduce the effective ray diameter of each surface which is required to transmit the object image.

Since the plane on which the optical units move is set to be parallel to the plane that contains almost all reference axes, inclusive of the reference axes in the two optical units that vary their relative positions, it is possible to readily maintain the parallelism between the plane that contains the reference axes and the plane on which the optical units move, even if the optical units move during variation of magnification. Accordingly, it is possible to eliminate decentering aberration due to a relative inclination between the movement plane on which the optical units move during variation of magnification and the plane which contains the reference axes.

Since the optical units move on one plane during variation of magnification, it is possible to readily prevent parallel decentering from occurring in a direction perpendicular to the direction of movement of the optical units. In addition, the rotation of each of the optical units in a plane perpendicular to the movement plane can be eliminated in principle.

Since each of the optical units is arranged on one plane, the optical units can be incorporated from one direction, so that assembly becomes easy and assembly cost can be reduced.

Since the stop is disposed on the object side of the optical system, it is possible to achieve a zoom lens having an optical system the angle of view of which can be made wider without increasing the lens diameter of the optical system.

What is claimed is:

1. An image forming optical apparatus for forming an image on an image pickup surface of an image pickup element comprising:
    an optical unit composed of cemented transparent material having a light entrance surface, a light exit surface and a light reflecting surface which is an aspherical surface having not more than one plane of symmetry, and the light entering the light entrance surface propagates through said cemented transparent material, is reflected by said light reflecting surface and exits from said light exit surface; and
    said image pickup element, positioned so that its image pickup surface receives light exiting from said light exit surface.

2. An optical apparatus according to claim 1, wherein said optical unit has a portion having a refractive power differing from another portion thereof.

3. An optical apparatus according to claim 1, wherein said light reflecting surface has a curvature varying according to an azimuth angle.

4. An optical apparatus according to claim 1, wherein said light entrance surface is a curved surface having a shape of rotational symmetry.

5. An optical apparatus according to claim 1, wherein said light exit surface is a curved surface having a shape of rotational symmetry.

6. An optical apparatus according to claim 1, wherein said cemented transparent material has an internal refracting surface positioned immediately behind said light entrance surface.

7. An optical apparatus according to claim 1, wherein said cemented transparent materials has an internal refracting surface positioned immediately before said light exit surface.

8. An optical apparatus according to claim 1, wherein said cemented transparent material has an internal refracting surface having a spherical shape of rotational symmetry.

9. An optical apparatus according to claim 1, wherein a stop member is provided in front of said light entrance surface.

10. An image forming optical apparatus comprising:

an optical unit composed of cemented transparent material, wherein said cemented transparent material has a light entrance surface, a light exit surface and a light reflecting surface which is an aspherical surface having not more than one plane of symmetry, and the light entering the light entrance surface propagates through the inside of said cemented transparent material, is reflected by said light reflecting surface and exits from said light exit surface; and a second optical unit which shares an optical path with said optical unit and includes a second cemented transparent material having a second light entrance surface, a second light exit surface and a second light reflecting surface which is an aspherical surface having not more than one plane of symmetry, and the light entering the second light entrance surface propagates through the inside of said second cemented transparent material, is reflected by said second light reflecting surface and exits from said second light exit surface.

11. An optical apparatus according to claim 10, wherein variation of magnification is performed by varying a relative distance between said optical unit and said second optical unit.

12. An optical apparatus according to claim 10, wherein focusing is performed by varying a relative distance between said optical unit and said second optical unit.

13. An optical apparatus according to claim 10, wherein light which exits from said light exit surface of said second optical unit forms an image at a position where an image pickup member is disposed.

* * * * *

UNITED STATES PATENT AND TRADEMARK OFFICE
CERTIFICATE OF CORRECTION

PATENT NO.    : 6,301,064 B1
DATED         : October 9, 2001
INVENTOR(S)   : Keisuke Araki et al.

It is certified that error appears in the above-identified patent and that said Letters Patent is hereby corrected as shown below:

<u>Title page,</u>
Item [30], "(KR)" should read -- (JP) --.

<u>Column 5,</u>
Line 30, "patent applications" should read -- Patent Applications --.
Line 32, "6,021,004;" should read -- 6,021,004, --.

<u>Column 6,</u>
Line 55, "DRAWING" should read -- DRAWINGS --.

<u>Column 15,</u>
Line 56, "stop Rl,and" should read -- stop R1, and --.

<u>Column 18,</u>
Line 28, "B I" should read -- B1 --.
Line 38, "R2, 1," should read -- R2,1, --.

<u>Column 19,</u>
Line 4, "R1,l" should read -- R1,1 --.

<u>Column 24,</u>
Line 26, "R1,l" should read -- R1,1 --.
Line 37, "R2, 1" should read -- R2,1 --.

<u>Column 27,</u>
Line 27, "R2, 1" should read -- R2,1 --.

<u>Column 30,</u>
Line 26, "β3w" should read -- β3W --.

<u>Column 31,</u>
Line 57, "3x4" should read -- *x4 --.

<u>Column 32,</u>
Line 30, "FIG." (1$^{st}$ occurrence) should be deleted.

<u>Column 34,</u>
Line 60, "RS" should read -- R5 --.

UNITED STATES PATENT AND TRADEMARK OFFICE
CERTIFICATE OF CORRECTION

PATENT NO.   : 6,301,064 B1
DATED        : October 9, 2001
INVENTOR(S)  : Keisuke Araki et al.

It is certified that error appears in the above-identified patent and that said Letters Patent is hereby corrected as shown below:

Column 35,
Line 56, "Ri 1" should read -- R1,1 --.

Column 36,
Line 17, "are" (first occurrence) should read -- is --.

Column 39,
Line 6, "materials" should read -- material --.

Signed and Sealed this

Twenty-fourth Day of December, 2002

JAMES E. ROGAN
*Director of the United States Patent and Trademark Office*